United States Patent
Wu et al.

(10) Patent No.: US 8,429,231 B2
(45) Date of Patent: *Apr. 23, 2013

(54) VOICE INSTANT MESSAGING

(75) Inventors: Shuwu Wu, Foothill Ranch, CA (US); James Crawford, Belmont, MA (US)

(73) Assignee: Facebook, Inc., Menlo Park, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/228,373

(22) Filed: Sep. 8, 2011

(65) Prior Publication Data

US 2011/0320553 A1    Dec. 29, 2011

Related U.S. Application Data

(63) Continuation of application No. 09/810,159, filed on Mar. 19, 2001, now Pat. No. 8,041,768.

(60) Provisional application No. 60/189,974, filed on Mar. 17, 2000, provisional application No. 60/239,917, filed on Oct. 13, 2000.

(51) Int. Cl.
*G06F 15/16* (2006.01)

(52) U.S. Cl.
USPC ........... 709/205; 709/226; 715/744; 715/751; 715/758

(58) Field of Classification Search .......... 709/203–207, 709/227–238, 245–246; 715/744, 751, 578, 715/759

See application file for complete search history.

(56) References Cited

U.S. PATENT DOCUMENTS

| 4,837,798 A | 6/1989 | Cohen et al. |
| 5,086,394 A | 2/1992 | Shapira |
| 5,276,905 A | 1/1994 | Hurst et al. |
| 5,327,486 A | 7/1994 | Wolff et al. |
| 5,533,110 A | 7/1996 | Pinard et al. |
| 5,548,637 A | 8/1996 | Heller et al. |
| 5,557,659 A | 9/1996 | Hyde-Thomson |
| 5,583,920 A | 12/1996 | Wheeler, Jr. |
| 5,608,786 A | 3/1997 | Gordon |
| 5,610,910 A | 3/1997 | Focsaneanu et al. |
| 5,694,616 A | 12/1997 | Johnson et al. |
| 5,721,906 A | 2/1998 | Siefert |
| 5,742,905 A | 4/1998 | Pepe et al. |
| 5,764,916 A | 6/1998 | Busey et al. |
| 5,774,670 A | 6/1998 | Montulli |

(Continued)

FOREIGN PATENT DOCUMENTS

| EP | 0862304 | 9/1998 |
| EP | 1176840 | 1/2002 |

(Continued)

OTHER PUBLICATIONS

Tapas et al. "NetEffect: A network architecture for large-scale multi-user vitrual worls" ACM VRST '97. 1997. pp. 157-163.*

(Continued)

*Primary Examiner* — David Lazaro
(74) *Attorney, Agent, or Firm* — Keller Jolley & Preece

(57) ABSTRACT

Systems and techniques for transferring electronic data include enabling instant messaging communication between a sender an at least one recipient through an instant messaging host. In addition, voice communication is enabled between the sender and the recipient through the instant messaging host.

18 Claims, 8 Drawing Sheets

U.S. PATENT DOCUMENTS

| | | | |
|---|---|---|---|
| 5,793,365 A | 8/1998 | Tang et al. | |
| 5,802,470 A | 9/1998 | Gaulke et al. | |
| 5,848,134 A | 12/1998 | Sekiguchi et al. | |
| 5,850,594 A | 12/1998 | Cannon et al. | |
| 5,859,979 A | 1/1999 | Tung et al. | |
| 5,867,162 A | 2/1999 | O'Leary et al. | |
| 5,870,744 A | 2/1999 | Sprague | |
| 5,872,521 A | 2/1999 | Lopatukin et al. | |
| 5,878,219 A | 3/1999 | Vance, Jr. et al. | |
| 5,893,091 A | 4/1999 | Hunt et al. | |
| 5,893,099 A | 4/1999 | Schreiber et al. | |
| 5,919,247 A | 7/1999 | Van Hoff et al. | |
| 5,920,692 A | 7/1999 | Nguyen et al. | |
| 5,940,488 A | 8/1999 | DeGrazia et al. | |
| 5,946,617 A | 8/1999 | Portaro et al. | |
| 5,948,058 A | 9/1999 | Kudoh et al. | |
| 5,951,643 A | 9/1999 | Shelton et al. | |
| 5,951,646 A | 9/1999 | Brandon | |
| 5,951,652 A | 9/1999 | Ingrassin, Jr. et al. | |
| 5,954,798 A | 9/1999 | Shelton et al. | |
| 5,956,716 A | 9/1999 | Kenner et al. | |
| 5,960,173 A | 9/1999 | Tang et al. | |
| 5,987,113 A | 11/1999 | James | |
| 5,987,407 A | 11/1999 | Wu et al. | |
| 5,991,791 A | 11/1999 | Siefert | |
| 5,995,023 A | 11/1999 | Kreft | |
| 6,002,402 A | 12/1999 | Schacher | |
| 6,006,179 A | 12/1999 | Wu et al. | |
| 6,009,413 A | 12/1999 | Webber et al. | |
| 6,012,051 A | 1/2000 | Sammon, Jr. et al. | |
| 6,014,135 A | 1/2000 | Fernandes | |
| 6,014,638 A | 1/2000 | Burge et al. | |
| 6,026,403 A | 2/2000 | Siefert | |
| 6,026,429 A | 2/2000 | Jones et al. | |
| 6,049,533 A | 4/2000 | Norman et al. | |
| 6,065,047 A | 5/2000 | Carpenter et al. | |
| 6,070,171 A | 5/2000 | Snyder et al. | |
| 6,073,138 A | 6/2000 | De l'Etraz et al. | |
| 6,081,830 A | 6/2000 | Schindler | |
| 6,085,223 A | 7/2000 | Carino, Jr. et al. | |
| 6,088,435 A | 7/2000 | Barber et al. | |
| 6,134,432 A | 10/2000 | Holmes et al. | |
| 6,144,991 A | 11/2000 | England | |
| 6,151,584 A | 11/2000 | Papierniak et al. | |
| 6,161,130 A | 12/2000 | Horvitz et al. | |
| 6,166,730 A | 12/2000 | Goode et al. | |
| 6,175,831 B1 | 1/2001 | Weinreich et al. | |
| 6,192,395 B1 | 2/2001 | Lerner et al. | |
| 6,195,354 B1 | 2/2001 | Skalecki et al. | |
| 6,199,103 B1 | 3/2001 | Sakaguchi et al. | |
| 6,212,548 B1 | 4/2001 | DeSimone et al. | |
| 6,212,550 B1 | 4/2001 | Segur | |
| 6,223,213 B1 | 4/2001 | Cleron et al. | |
| 6,233,577 B1 | 5/2001 | Ramasubramani et al. | |
| 6,249,740 B1 | 6/2001 | Ito et al. | |
| 6,260,148 B1 | 7/2001 | Aggarwal et al. | |
| 6,269,369 B1 | 7/2001 | Robertson | |
| 6,301,609 B1 | 10/2001 | Aravamudan et al. | |
| 6,311,211 B1 | 10/2001 | Shaw | |
| 6,314,450 B1 | 11/2001 | Hachiya et al. | |
| 6,317,776 B1 | 11/2001 | Broussard et al. | |
| 6,324,541 B1 | 11/2001 | De l'Etraz et al. | |
| 6,330,590 B1 | 12/2001 | Cotton | |
| 6,347,332 B1 | 2/2002 | Malet et al. | |
| 6,351,698 B1 | 2/2002 | Kubota et al. | |
| 6,363,392 B1 | 3/2002 | Halstead et al. | |
| 6,374,246 B1 | 4/2002 | Matsuo | |
| 6,374,290 B1 | 4/2002 | Scharber et al. | |
| 6,389,127 B1 | 5/2002 | Vardi et al. | |
| 6,389,372 B1 | 5/2002 | Glance et al. | |
| 6,393,464 B1 | 5/2002 | Dieterman | |
| 6,400,381 B1 | 6/2002 | Barrett et al. | |
| 6,405,035 B1 | 6/2002 | Singh | |
| 6,415,318 B1 | 7/2002 | Aggarwal et al. | |
| 6,421,439 B1 | 7/2002 | Liffick | |
| 6,421,709 B1 | 7/2002 | McCormick et al. | |
| 6,425,012 B1 | 7/2002 | Trovato et al. | |
| 6,430,344 B1 | 8/2002 | Dixon et al. | |
| 6,430,604 B1 | 8/2002 | Ogle et al. | |
| 6,446,112 B1 | 9/2002 | Bunney et al. | |
| 6,449,344 B1 | 9/2002 | Goldfinger et al. | |
| 6,449,634 B1 | 9/2002 | Capiel | |
| 6,480,885 B1 | 11/2002 | Olivier | |
| 6,484,196 B1 | 11/2002 | Maurille | |
| 6,501,834 B1 | 12/2002 | Milewski et al. | |
| 6,507,866 B1 | 1/2003 | Barchi | |
| 6,525,747 B1 | 2/2003 | Bezos | |
| 6,529,475 B1 | 3/2003 | Wan et al. | |
| 6,535,586 B1 | 3/2003 | Cloutier et al. | |
| 6,539,421 B1 | 3/2003 | Appelman et al. | |
| 6,549,937 B1 | 4/2003 | Auerbach et al. | |
| 6,557,027 B1 | 4/2003 | Cragun | |
| 6,559,863 B1 | 5/2003 | Megiddo | |
| 6,564,248 B1 | 5/2003 | Budge et al. | |
| 6,564,261 B1 | 5/2003 | Gudjonsson et al. | |
| 6,571,234 B1 | 5/2003 | Knight et al. | |
| 6,574,599 B1 | 6/2003 | Lim et al. | |
| 6,580,790 B1 | 6/2003 | Henry et al. | |
| 6,606,647 B2 | 8/2003 | Shah et al. | |
| 6,615,241 B1 | 9/2003 | Miller et al. | |
| 6,636,733 B1 | 10/2003 | Helferich | |
| 6,640,230 B1 | 10/2003 | Alexander et al. | |
| 6,654,683 B2 | 11/2003 | Jin et al. | |
| 6,677,968 B1 | 1/2004 | Appelman | |
| 6,677,976 B2 | 1/2004 | Parker et al. | |
| 6,678,719 B1 | 1/2004 | Stimmel | |
| 6,691,162 B1 | 2/2004 | Wick | |
| 6,697,807 B2 | 2/2004 | McGeachie | |
| 6,701,348 B2 | 3/2004 | Sommerer | |
| 6,714,791 B2 | 3/2004 | Friedman | |
| 6,714,793 B1 | 3/2004 | Carey et al. | |
| 6,731,308 B1 * | 5/2004 | Tang et al. | 715/751 |
| 6,732,155 B2 | 5/2004 | Meek | |
| 6,738,822 B2 | 5/2004 | Fukasawa et al. | |
| 6,747,970 B1 | 6/2004 | Lamb et al. | |
| 6,748,421 B1 | 6/2004 | Ozkan et al. | |
| 6,750,881 B1 | 6/2004 | Appelman | |
| 6,757,365 B1 | 6/2004 | Bogard | |
| 6,757,732 B1 | 6/2004 | Soilee et al. | |
| 6,772,188 B1 | 8/2004 | Cloutier | |
| 6,781,608 B1 | 8/2004 | Crawford | |
| 6,785,554 B1 | 8/2004 | Amerga | |
| 6,785,681 B2 | 8/2004 | Keskar et al. | |
| 6,785,781 B2 | 8/2004 | Leenstra et al. | |
| 6,788,769 B1 | 9/2004 | Waites | |
| 6,795,863 B1 | 9/2004 | Doty | |
| 6,799,039 B2 | 9/2004 | Wu et al. | |
| 6,800,031 B2 | 10/2004 | Di Cesare | |
| 6,807,574 B1 | 10/2004 | Partovi et al. | |
| 6,839,737 B1 | 1/2005 | Friskel | |
| 6,857,006 B1 | 2/2005 | Nishizawa | |
| 6,879,665 B1 | 4/2005 | Cook et al. | |
| 6,901,559 B1 | 5/2005 | Blum et al. | |
| 6,904,026 B1 | 6/2005 | Tarnanen et al. | |
| 6,907,243 B1 | 6/2005 | Patel | |
| 6,912,563 B1 | 6/2005 | Parker et al. | |
| 6,912,564 B1 | 6/2005 | Appelman et al. | |
| 6,917,965 B2 | 7/2005 | Gupta et al. | |
| 6,920,478 B2 | 7/2005 | Mendiola et al. | |
| 6,941,345 B1 | 9/2005 | Kapil et al. | |
| 6,968,179 B1 | 11/2005 | DeVries | |
| 6,993,564 B2 | 1/2006 | Whitten, II | |
| 6,996,520 B2 | 2/2006 | Levin | |
| 7,035,865 B2 | 4/2006 | Doss et al. | |
| 7,039,676 B1 | 5/2006 | Day et al. | |
| 7,043,530 B2 * | 5/2006 | Isaacs et al. | 709/206 |
| 7,058,036 B1 | 6/2006 | Yu et al. | |
| 7,058,690 B2 | 6/2006 | Maehiro | |
| 7,065,186 B1 | 6/2006 | Myers et al. | |
| 7,082,047 B2 | 7/2006 | Chow | |
| 7,082,407 B1 | 7/2006 | Bezos et al. | |
| 7,120,687 B1 | 10/2006 | Tessman et al. | |
| 7,124,123 B1 | 10/2006 | Roskind et al. | |
| 7,127,232 B2 | 10/2006 | O'Neil et al. | |
| 7,171,473 B1 | 1/2007 | Eftis et al. | |
| 7,177,880 B2 | 2/2007 | Ruvolo | |
| 7,185,059 B2 | 2/2007 | Daniell et al. | |

| | | |
|---|---|---|
| 7,190,956 B2 | 3/2007 | Dorenbosch et al. |
| 7,200,634 B2 | 4/2007 | Mendiola et al. |
| 7,202,814 B2 | 4/2007 | Caspi et al. |
| 7,222,156 B2 | 5/2007 | Gupta et al. |
| 7,233,992 B1 | 6/2007 | Muldoon et al. |
| 7,275,215 B2 | 9/2007 | Wemdorfer et al. |
| 7,313,760 B2 | 12/2007 | Grossman et al. |
| 7,436,780 B2 | 10/2008 | Stephens et al. |
| 7,437,413 B2 | 10/2008 | Okuyama et al. |
| 7,512,407 B2 | 3/2009 | Wu et al. |
| 7,956,739 B2 | 6/2011 | Hong et al. |
| 7,958,212 B1 | 6/2011 | Wong et al. |
| 7,996,527 B2 | 8/2011 | Isaacs et al. |
| 8,015,504 B1 | 9/2011 | Lynch et al. |
| 8,019,834 B2 | 9/2011 | Horvitz et al. |
| 2001/0005861 A1 | 6/2001 | Mousseau et al. |
| 2001/0013050 A1 | 8/2001 | Shah |
| 2001/0032246 A1 | 10/2001 | Fardella et al. |
| 2001/0052019 A1 | 12/2001 | Walters et al. |
| 2002/0015061 A1 | 2/2002 | Maguire |
| 2002/0021307 A1 | 2/2002 | Glenn et al. |
| 2002/0023132 A1 | 2/2002 | Tornabene et al. |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0049717 A1 | 4/2002 | Routtenberg et al. |
| 2002/0056123 A1 | 5/2002 | Liwerant et al. |
| 2002/0065856 A1 | 5/2002 | Kisiel |
| 2002/0065894 A1 | 5/2002 | Dalal et al. |
| 2002/0077080 A1 | 6/2002 | Greene |
| 2002/0083136 A1 | 6/2002 | Whitten, II |
| 2002/0091667 A1 | 7/2002 | Jaipuria et al. |
| 2002/0101446 A1* | 8/2002 | Tang et al. ............... 345/751 |
| 2002/0103801 A1 | 8/2002 | Lysons |
| 2002/0112181 A1 | 8/2002 | Smith |
| 2002/0116463 A1 | 8/2002 | Hart |
| 2002/0116641 A1 | 8/2002 | Mastrianni |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0174010 A1 | 11/2002 | Rice, III |
| 2002/0175953 A1 | 11/2002 | Lin |
| 2002/0181703 A1 | 12/2002 | Logan et al. |
| 2002/0184089 A1 | 12/2002 | Tsou et al. |
| 2002/0193942 A1 | 12/2002 | Odakura et al. |
| 2002/0199095 A1 | 12/2002 | Bandini et al. |
| 2003/0004855 A1 | 1/2003 | Dutta et al. |
| 2003/0004872 A1 | 1/2003 | Gardi et al. |
| 2003/0009385 A1 | 1/2003 | Tucciarone et al. |
| 2003/0009523 A1 | 1/2003 | Lindskog et al. |
| 2003/0018726 A1 | 1/2003 | Low et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0037112 A1 | 2/2003 | Fitzpatrick et al. |
| 2003/0043201 A1 | 3/2003 | Abdelhadi et al. |
| 2003/0046198 A1 | 3/2003 | Knapp et al. |
| 2003/0050916 A1 | 3/2003 | Ortega et al. |
| 2003/0084103 A1 | 5/2003 | Weiner et al. |
| 2003/0093580 A1 | 5/2003 | Thomas et al. |
| 2003/0105822 A1 | 6/2003 | Gusler et al. |
| 2003/0131061 A1 | 7/2003 | Newton et al. |
| 2003/0140103 A1 | 7/2003 | Szeto et al. |
| 2003/0167324 A1 | 9/2003 | Farnham et al. |
| 2003/0182394 A1 | 9/2003 | Ryngler et al. |
| 2003/0187813 A1 | 10/2003 | Goldman et al. |
| 2003/0212804 A1 | 11/2003 | Hashemi |
| 2003/0225847 A1 | 12/2003 | Heikes et al. |
| 2003/0236835 A1 | 12/2003 | Levi et al. |
| 2004/0015548 A1 | 1/2004 | Lee |
| 2004/0054729 A1 | 3/2004 | Fukuizumi et al. |
| 2004/0056901 A1 | 3/2004 | March et al. |
| 2004/0117443 A1 | 6/2004 | Barsness |
| 2004/0122681 A1 | 6/2004 | Ruvolo |
| 2004/0122810 A1 | 6/2004 | Mayer |
| 2004/0122855 A1 | 6/2004 | Ruvolo |
| 2004/0128356 A1 | 7/2004 | Bernstein et al. |
| 2004/0179039 A1 | 9/2004 | Blattner et al. |
| 2004/0186738 A1 | 9/2004 | Reisman |
| 2004/0210844 A1 | 10/2004 | Pettinati et al. |
| 2004/0215648 A1 | 10/2004 | Marshall |
| 2004/0215721 A1 | 10/2004 | Szeto et al. |
| 2004/0260762 A1 | 12/2004 | Fish |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0038856 A1 | 2/2005 | Krishnasamy et al. |
| 2005/0043989 A1 | 2/2005 | Shifrin |
| 2005/0044152 A1 | 2/2005 | Hardy et al. |
| 2005/0050143 A1 | 3/2005 | Gusler et al. |
| 2005/0060377 A1 | 3/2005 | Lo et al. |
| 2005/0076241 A1 | 4/2005 | Appelman |
| 2005/0080863 A1 | 4/2005 | Danielf |
| 2005/0086211 A1 | 4/2005 | Mayer |
| 2005/0102202 A1 | 5/2005 | Linden et al. |
| 2005/0114229 A1 | 5/2005 | Ackley et al. |
| 2005/0153681 A1 | 7/2005 | Hanson |
| 2005/0197846 A1 | 9/2005 | Pezaris |
| 2005/0198173 A1 | 9/2005 | Evans |
| 2006/0075044 A1 | 4/2006 | Fox et al. |
| 2006/0167991 A1 | 7/2006 | Heikes et al. |
| 2006/0168054 A1 | 7/2006 | Burkhart et al. |
| 2006/0173824 A1 | 8/2006 | Bensky et al. |
| 2006/0173963 A1 | 8/2006 | Roseway et al. |
| 2006/0182248 A1 | 8/2006 | Smith et al. |
| 2006/0212561 A1 | 9/2006 | Feng |
| 2006/0277187 A1 | 12/2006 | Roese et al. |
| 2007/0156664 A1 | 7/2007 | Norton et al. |
| 2008/0082620 A1* | 4/2008 | Barsness ............... 709/207 |
| 2009/0089316 A1 | 4/2009 | Kogan et al. |
| 2010/0306674 A1* | 12/2010 | Salesky et al. ............... 715/753 |

FOREIGN PATENT DOCUMENTS

| | | |
|---|---|---|
| GB | 2319137 | 5/1998 |
| GB | 2357932 | 7/2001 |
| GB | 2368747 | 5/2002 |
| JP | 08/314826 | 11/1996 |
| JP | 2000-049901 | 2/2000 |
| JP | 2000-259514 | 9/2000 |
| JP | 2000-284999 | 10/2000 |
| JP | 2001-084320 | 3/2001 |
| WO | WO 97/10558 | 3/1997 |
| WO | WO 97/14234 | 4/1997 |
| WO | WO 97/46955 | 12/1997 |
| WO | WO 98/16045 | 4/1998 |
| WO | WO 98/47270 | 10/1998 |
| WO | WO 99/08434 | 2/1999 |
| WO | WO 99/34628 | 7/1999 |
| WO | WO 99/48011 | 9/1999 |
| WO | WO 00/16201 | 3/2000 |
| WO | WO 00/24154 | 4/2000 |
| WO | WO 00/60809 | 10/2000 |
| WO | WO 00/79396 | 12/2000 |
| WO | WO 01/06748 | 1/2001 |
| WO | WO 01/22258 | 3/2001 |
| WO | WO 01/24036 | 4/2001 |
| WO | WO 01/43357 | 5/2001 |
| WO | WO 01/67787 | 9/2001 |
| WO | WO 01/72020 | 9/2001 |
| WO | WO 01/80079 | 10/2001 |
| WO | WO 02/03216 | 1/2002 |
| WO | WO 02/09437 | 1/2002 |
| WO | WO 02/35781 | 5/2002 |
| WO | WO 02/62039 | 8/2002 |
| WO | WO 02/73886 | 9/2002 |
| WO | WO 02/073886 | 9/2002 |
| WO | WO 2004/28178 | 4/2004 |
| WO | WO 2005/86723 | 9/2005 |
| WO | WO 2005/086723 | 9/2005 |

OTHER PUBLICATIONS

"A Countermeasure to Duplicate-detecting Anti-spam Techniques," Robert J. Hall, AT&T Labs Technical Report 99.9.1, 1999, Abst. and pp. 1-26.

"A Reputation System for Peer-to-Peer Networks," Gupta et al., Jun. 1-3, 2003, NOSSDAV'03, Monterey, California, pp. 144-152.

"About File Transfers", AOL Instant Messenger, version 4.3, Help

Documentation, available on Jul. 21, 2001, 5 pages.
"About Internet directory services," Outlook 2000 SR-1 (9.0.0. 4527) Help File, on or before Aug. 10, 2001, p. 1.
"Active Directory Features," [online], Jun. 15, 1999 [retrieved on May 13, 2003]. Retrieved from the Internet http://www.microsoft.com/windows2000/server/evaluation/fearures/adlist.asp, pp. 1-4.
"Active Directory Service Overview," [online], Nov. 30, 2001 [retrieved on May 13, 2003]. Retrieved from the Internet http://www.microsoft.com/windows2000/server/evaluation/business/-_addatasheet.asp, pp. 1-5.
"Active Directory," [online], retrieved on May 13, 2003]. Retrieved from the Internet http://www.microsoft.com/windows2000/technologies/directory/AD/default.asp, pp. 1-13.
"AOL Instant Messenger All New Version 2.0", 2 pages, Jun. 24, 1999.
"AOL Instant Messenger", reprinted from http://web.archive.org/web/20010721193059/http://aim.com/ (Way Back Machine—available on Jul. 21, 2001) on Aug. 26, 2005, 7 pages.
"Benefits of Active Directory in a Windows 2000 Environment," [online], Sep. 20, 2001 [retrieved on May 13, 2003]. Retrieved from the Internet http://www.microsoft.com/windows2000/-server/evaluation/business/adwin2k.asp pp. 1-9.
"BestCalls.com Announces the BestCalls Technology Index," Business Wire, Jun. 30, 1999, Business Wire, p. 2.
"Better Bayesian Filtering," Paul Graham, Jan. 2003, pp. 1-11, http://www.paulgraham.co/better.html.
"Business at Cyberspeed; Brainstorm Becomes Quick Internet Hit," Walker, Jan. 24, 1999, The Washington Post, p. A.01 (4 total pages).
"Degrees of Separation Email Spam Protection," Halfbakery: Degrees of Separation Email Spam Protection, reprinted from http://halfbakery.com/idea/Degrees_20of_20Separation_20Email_20Protecti . . . printed on Mar. 1, 2004 (3 pages).
"Digital Artifacts for Remembering and Storytelling: Post History and Social Network Fragments," Viegas et al., retrieved from World Wide Web: http://we.media.mit.edu/~fviegas/papers/posthistory_snf.pdf, 10 total pages (Jan. 2004).
"Directory Integration Can Lower Total Cost of Ownership and Increase Application Functionality," [online], Jul. 27, 1998 [retrieved on May 13, 2003]. Retrieved from the Internet http://www.microsoft.com/presspass/press/1998/Jul98/ActivDPR.asp pp. 1 of 4.
"Enterprise Identity Management with Windows 2000 and Active Directory," [online], 1999 [retrieved on May 13, 2003]. Retrieved from the Internet <http://www.microsoft.com/technet/prodtechnol/ad/windows2000/evaluate/w2keims.asp?fra . . . >, pages 1-16.
"Finding Others Online: Reputation Systems for Social Online Spaces," Jensen et al., Apr. 20-25, 2002, CHI, Minneapolis, Minnesota, vol. 4, Issue 1, pp. 447-454.
"Frequently Asked Questions About AOL Instant Messenger", 6 pages, Jun. 24, 1999.
"GLWebMail 2.0 is released!" http://www.gordano.com: available on Apr. 18, 2001, reprinted from http://web.archive.org/web/20010418153714//http://www.gordano.com, 2 pages.
"Hottie or Nottie? Web Site Voters Let You Know Whether You Sizzle or Fizzle," Marino, Jul. 11, 2001, Florida Times Union, p. 2 pages.
"Icq.anywhere, Email Features—Email Center—ICQ.com," retrieved Apr. 29, 2004 from the World Wide Web: http://www.ico.com/email/popular-features.html, pp. 1-5.
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnlx=0&adxnnlx=107029 . . . , printed on Nov. 5, 2004 (3 pages).
"Instant Messaging for Gamers," PC Gamer, May 2004, vol. 11, No. 5, (2 pages).
"Integrating Applications with Windows 2000 and Active Directory," [online], Oct. 2000 [retrieved on May 8, 2003]. Retrieved from the Internet <http://www.microsoft.com/technet/-prodtechnol/ad/windows2000/evaluate/adappstr.asp?fra . . . >, pages 1-12.
"Integrating Microsoft Metadirectory Services and Active Directory," [online], Aug. 31, 2000 [retrieved on May 13, 2003]. Retrieved from the Internet http://www.microsoft.com/windows2000/-server/evaluation/business/adwin2k.asp, p. 1.

"Internet Call Centers: New Era in Customer Service", Joseph McKendrick, Aug. 18, 2005, 4 pages.
"Gordano Messaging Server"; http://www.gordano.com; Copyright 1994-2003 Gordano, 1 page.
"Learning Spam: Simple Techniques for Freely-Available Software," Bart Massey et al, Computer Science Dept., Portland, OR USA, 2003, pp. 1-14.
"Learning to Filter Spam E-Mail: A Comparison of a Naïve Bayesian and a Memory-Based Approach," Ion Adroutsopoulos et al., University of Athens, Sep. 2000, pp. 1-12.
"Look up contact information from an item," Outlook 2000 SR-1 (9.0.0. 4527) Help File, on or before Aug. 10, 2001, p. 1.
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"New Features in AOL Instant Messenger for Windows v. 2.01 Beta", 2 pages, Apr. 28, 1999.
"Part I: Active Directory Operations," Active Directory Operations Guide, Microsoft Corporation, Microsoft Windows 2000, Version 1.5, pp. 1-187.
"Part II: Tasks and Procedures Appendices," Active Directory Operations Guide, Microsoft Corporation, Microsoft Windows 2000, Version 1.5, pp. 1-131.
"PieSpy—Inferring and Visualizing Social Network on IRC," PieSpy Social Network Bot, reprinted from http://lister.linux-srv.anix.net/piespy printed on Mar. 11, 2004 (18 pages).
"plaxo," Plaxo, reprinted from http://web.archive.org/web/20041105072256/http://www.pfaxo.com/ printed on Nov. 5, 2004 (available on Feb. 14, 2004) (2 pages).
"Plaxo-Update Your Address Book," Plaxo Contact Networks, reprinted from http://web.archive.org/web/20030218233638/http://www.plaxo.com/ printed on Nov. 5, 2004 (available on Feb. 18, 2003) (1 page).
"Quick Tips for Getting Started", 5 pages, Jun. 24, 1999.
"Reflections on Friendster, Trust and Intimacy," Danah Boyd. Ubicomp 2003, Workshop Application for the Intimate Ubiquitous Computing Workshop. Seattle, WA, Oct. 12-15, 2003, 4 pages.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging,* retrieved Apr. 29, 2004 from the World Wide Web: http://www rimrod.com/software/rim1/Webmessenger-RIM-J2ME-Instant-Messaging-20 . . . ," pp. 1-4.
"Set up LDAP directory services," Outlook 2000 SR-1 (9.0.0. 4527) Help File, on or before Aug. 10, 2001, p. 1.
"Six Degrees—New Programs Help Companies 'Mine Workers' Relationships for Key Business Prospects," William M. Bulkeley et al., Marketplace, The Wall Street Journal, Aug. 4, 2003. (3 pages).
"Social Nets Find Friends in VCs." Joanna Glasner. http://www.wired.com/news , Nov. 17, 2003, 4 pages.
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, 1 page.
"Social Networking for Business: Release 0.5," Esther Dyson, Esther Dyson's Monthly Report, vol. 21, No. 10, Nov. 25, 2003, www.edventure.com. (36 pages).
"Social Networks: Deodorant for the Soul?," Esther Dyson, Esther Dyson's Monthly Report, vol. 21, No. 11, Dec. 12, 2003, www.edventure.com (36 pages).
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004, 2 pages.
"Socialware: Multiagent Systems for Supporting Network Communities," Hattori et al., Mar. 1999, Association for Computing Machinery, Communications of the ACM, vol. 42, Issue 3, 6 pages.
"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).
"Support Vector Machines for Spam Categorization," Harris Drucker et al., IEEE Transactions on Neural Networks, vol. 10, No. 5, Sep. 1999, pp. 1048-1054.

"Support Vector Machines," Marti Hearst, IEEE Intelligent Systems, Jul./Aug. 1998, pp. 18-28.

"SVM-based Filtering of E-mail Spam with Content-specific Misclassification Costs," Aleksander Kolcz et al., *TextDM'2001 (IEEE ICDM-2001 Workshop on Text Mining)*, San Jose. CA, 2001, pp. 1-14.

"SWF Seeks Attractive Head Shot; To Stand Out, Online Daters Pay for Professional Photos; Cropping out the Ex-Wife," Leiber, Nov. 19, 2003, The Wall Street Journal, 1 page.

"Technical Solutions for Controlling Spam," Shane Hird, Proceedings of AUUG2002, Melbourne, Sep. 4-6, 2002, 17 pages.

"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).

Telstra targets Net spammers,* J. Dudley, news.com.au, Dec. 2, 2003, 2 pages.

"Text Categorization with Support Vector Machines: Learning with Many Relevant Features," Thorsten Joachims, University of Dortmund, Computer Science Dept., LS-8 Report 23, 1998, 8 pages.

"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).

"The LP Wireless Messenger", Messenger Documentation, http://www.lpwireless.com/messengerhelp.htm, available on Dec. 9, 2002, reprinted from http://web.archive.org/web20021209025321/http//lpwireless.com/messengerhelp-htm, pp. 1-7.

Trillion Discussion Forums—HOWTO: import ICQ 2003a Contact List,* retrieved Apr. 29, 2004 from the World Wide Web: http://trillian.cc/forums/showthread.php?s+&threadid=36475, pp. 1-2.

"Using Active Directory Service", from Chapter 5, Microsoft Windows 2000 Administrator's Pocket Consultant, by William R. Stank (1999). Retrieved from http://www.microsoft.com/technet/prodtechnol/ad/windows2000/evaluate/05w2kadb.asp?fr . . . , pp. 1-6.

"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).

"What is AOL Instant Messenger", 3 pages, Jun. 24, 1999.

What's new about exchanging information over the Internet, Outlook 2000 SR-1 (9.0.0.4527) Help File, on or before Aug. 10, 2001, p. 1.

"Will You Buy a Car From This Man?," Leander Kahney, Oct. 6, 2003. pp. 1-3.

"Windows 2000 Directory Services", [online] http://www.mircrosoft.com/windows2000/technologies/directory/default.asp, as of Nov. 25, 2001 according to Internet Archive Wayback Machine, available at http://web.archive.org/web20011625224156/http://www.microsoft.com/windowns2000/technologies/directory/default_asp, 1 pages.

"Windows 2000 Directory Services," [online], [retrieved on May 13, 2003). Retrieved from the Internet http://www.microsoft.com/windows2000/technologies/directory/default.asp, pp. 1-2.

Working with Active Directory Domains*, from Chapter 5, *Microsoft Windows 2000 Administrator's Pocket Consultant*, by William R. Stank (1999). Retrieved from http://www.microsoft.com/technet/prodtechnol/ad/windows2000/evaluate/05w2kadb.asp?fr . . . , pp. 1-10.

America Online Inc., "AOL Instant Messenger", Aug. 29, 2000, Internet: www.aol.com/aim/, 2 pages.

America Online Inc., "New AIM 4.7", Sep. 27, 2001, Internet: http://aim.aol.com, 5 pages.

Anand Ranganalhan et al., "ConChat: A Context-Aware Chat Program", 2002, Pervasive Computing, pp. 51-57.

Announce: Implementation of E-mail Spam Proposal, Maurice I. Marvin, news.admin.net-abuse.misc, Aug. 3, 1996, 2 pages.

Archive.org archived the Morpheus 1.9.1 download page on clnet Download.com [online] Aug. 3, 2002 [accessed Feb. 14, 2007], Retrieved from Internet, URL:http://web.archive.org/web/20020803071751/download.com.com/3000-2166-10057840.html>, 2 pages.

Archive.org archived the MusicCity Morpheus download page on clnet Download.com [online] Oct. 8, 2001 [accessed Feb. 14, 2007], Retrieved from Internet, URL:http://web.archive/org/web/20011008191757/download.cnet.com/downloads/0-18964201005590701.html>, 2 pages.

Australian Office Action of Apr. 7, 2006, App. No. 2002340039 (2 pages).

BuddyGopher~About, available on Jul. 13, 2004, reprinted from http://web.archive.org/web/20040713002836/www.buddygopher.com/about.html on Sep. 28, 2005 (4 pgs).

BuddyGopher—We Love Away Messages!, "BuddyGopher simultaneously checks the away messages of your favorite AIM® buddies.", available on Sep. 24, 2004, reprinted from http://web.archive.org/web/20040924104001/http://www.buddygopher.com/ on Sep. 28, 2005 (2 pgs).

Chinese Office Action of Jul. 7, 2006, App. No. 02821420X (5 pages).

CNET Networks Inc., "PopUp Killer", Sep. 13, 2001, Internet: download.cnet.com/downloads/0-10059-100-6932612.html, 1 page.

International Search Report and Written Opinion dated Feb. 15, 2006 for International Application No. PCT/US05/07204, 10 pages.

International Search Report for International Application No. PCT/US03/15715, mailed Aug. 14, 2003, 6 pages.

International Search Report mailed Aug. 30, 2005 for International Application No. EP03731244., 4 pages.

Notice of Allowance for U.S. Appl. No. 10/184,002 dated Jul. 24, 2008. 9 pages.

Office Action issued in U.S. Appl. No. 10/981,460, dated Aug. 20, 2008, 17 pages.

Office Action issued in U.S. Appl. No. 10/134,437, dated Mar. 10, 2009, 31 pages.

Office Action issued in U.S. Appl. No. 10/334,056, dated Jul. 6, 2005, 23 pages.

Office Action issued in U.S. Appl. No. 10/334,056, dated May 10, 2007, 7 pages.

Office Action issued in U.S. Appl. No. 10/334,056, dated May 12, 2008, 20 pages.

Office Action issued in U.S. Appl. No. 10/334,056, dated May 21, 2007, 7 pages.

Office Action issued in U.S. Appl. No. 10/334,056, dated Nov. 29, 2004, 20 pages.

Office Action issued in U.S. Appl. No. 10/334,056, dated Nov. 5, 2007, 15 pages.

Office Action issued in U.S. Appl. No. 10/334,056, dated Oct. 31, 2005, 7 pages.

Office Action issued in U.S. Appl. No. 11/015,424, dated Mar. 19, 2008, 32 pages.

Office Action issued in U.S. Appl. No. 11/015,424, dated Nov. 3, 2008, 46 pages.

Office Action issued in U.S. Appl. No. 11/017,204 dated Jun. 23, 2008, 25 pages.

Office Action issued in U.S. Appl. No. 11/017,204, dated Dec. 12, 2007, 11 pages.

Office Action issued in U.S. Appl. No. 11/238,110 dated Jul. 9, 2008, 10 pages.

Office Action issued in U.S. Appl. No. 11/238,110 dated Oct. 9, 2008, 11 pages.

Office Action issued in U.S. Appl. No. 11/238,110, dated Nov. 29, 2007, 9 pages.

Office Action issued in U.S. Appl. No. 11/238,129 dated May 28, 2008, 69 pages.

Office Action issued in U.S. Appl. No. 11/238,129 dated Nov. 14, 2007, 33 pages.

Office Action issued in U.S. Appl. No. 11/238,130 dated Apr. 14, 2009, 35 pages.

Office Action issued in U.S. Appl. No. 11/238,130 dated Nov. 13, 2008, 44 pages.

Office Action issued in U.S. Appl. No. 10/184,002, dated Jan. 8, 2008, 16 pages.

Office Action issued in U.S. Appl. No. 10/134,437 dated Sep. 18, 2008, 30 pages.

Supplementary European Search Report issued in European Application No. EP05728303, dated Jan. 9, 2009, (2 pages).

Courter et al., "Mastering Microsoft Outlook 2000 Premium Edition", Sybex Inc., Alameda, California, 2000, pp. 167-169, ISBN 0-7821-2676-6.

CrushParty.com: Help, retrieved Jun. 12, 2002 from the World Wide Web: http://www.crushparty.com/help.jsp, 3 pages.

Decision on Appeal in U.S. Appl. No. 10/146,814, dated Apr. 22, 2010, 12 pages.

Dodgeball.com:: mobile social software, "help: text messaging", available on Oct. 13, 2004, reprinted from http://web.archive.om/web/20041013034241_/www.dodgeball.com/social/help_text.php on Sep. 28, 2005 (3 pgs).

Dodgeball.com:: mobile social software, "help: the basics", available on Oct. 9, 2004, reprinted from http://web.archive.org/web/20041009200739/www.dodgeball.com/social/help_basics.php on Sep. 28, 2005 (2 pgs).

Dodgeball.com:: mobile social software, "help: use it", available on Oct. 9, 2004, reprinted from http://web.archive.ora/web/20041009201853/www.dodaeball.com/social/help_useit.php on Sep. 28, 2005 (2 pgs).

Dodgeball.com:: mobile social software, "Hook up with friends. Discover what's around you", available on Nov. 30,2003, reprinted from http://web.archive.org/web/20041130034344/www.dodgeball.com/social/index.php on Sep. 28, 2005 (2 pgs).

Dutta-Roy Amitava, "Virtual Meetings with Desktop Conferencing", IEEE Spectrum, vol. 35, No. 7, Jul. 1, 1998, pp. 47-56 and p. 66.

Ed Bott and Ron Person, Using Windows 95 with Internet Explorer 4.0, Feb. 17, 1998, Que, Special Edition. 5 pages.

Eschenburg, Wo laufen sie denn?, Oct. 26, 1998, pp. 92-95.

European Patent Office, Communication of Aug. 30, 2005, App. No. 03731244.4-2416 (PCT/US0315715) (4 pages).

European Patent Office, Communication of Aug. 31, 2009, App. No. 02778374.5-1238 (8 pages).

European Patent Office, Communication of Sep. 5, 2006, App. No. 02778374.5-1238 (4 pages).

European Search Report mailed Aug. 30, 2005 for European Application No. 03731244 (4 pages).

Examiner's Answer in U.S. Appl. No. 10/146,814 dated May 17, 2002, 19 pages.

Home-tribe.net. http://washingtondc.tribe.net/message/24434d1b-817b-4580-aa42-3bffa15f26a?page=1 (4 total pages, reprinted on Dec. 13, 2004).

http://www.friendster.com (17 pages, reprinted on Dec. 13, 2004).

IBM "Configuring Sametime servers in your Domino environment" May 1, 2000 (14 pages).

International Search Report and Written Opinion for PCT Application No. PCT/US2005/042992, Mar. 6, 2007 (14 pages).

International Search Report dated Oct. 16, 2006, for PCT/US05/08476, 9 pages.

International Search Report, Application No. PCT/US05/45663, dated Apr. 11, 2008, 10 pages.

International Search Report, Application No. PCT/US2006/018286, dated Oct. 19, 2006, 12 pages.

J.C. Cannon, "Design Guide for Directory-Enabled Applications," [online], Apr. 2001. Retrieved from the Internet http://msdn.microsoft.com/library/en-us/dnactdir/html/deal.asp?frame=true>, pp. 1-18.

Japanese Office Action of May 12, 2008 in Japanese Application No. 2003-533140 (5 pages).

Kohda et al., IMPP: A New Instant Messaging Standard and Its Impact on Internet Business, Dec. 2000, Fujitsu Sci. Tech. J., 36, 2, pp. 147-153.

Lotus Sametime 1.5 1999 (4 pages).

Mariano, Gwendolyn. ZDNetNews. "Morpheus 1.9 to be unleashed", [online] Jun. 10, 2002 [accessed Feb. 14, 2007]. Retrieved from Internet URL:http://news.zdnetcom/2100-3513_22-934615.html, 6 pages.

Mary Beth Marklein, "Student have 'away' with words", Mar. 28, 2004, USA Today, http://www.usatoday.com/tech/news/2004-03-28-aways-messages-usat_x.htm, 4 pages.

Microsoft Corporation, "Active Directory Services Interface in the Microsoft Exchange 5.5 Environment," [online], Nov. 1997 [retrieved on May 13, 2003]. Retrieved from the Internet http://msdn.microsoft.com/library/enus/dnactdir/html/msdn_adsiexch.asp?frame=true, pp. 1-12.

Microsoft Corporation, "Comparing Microsoft Active Directory to Novell's NDS," [online], Sep. 1998 retrieved on May 13, 2003]. Retrieved from the Internet http://msdn.microsoft.-com/library/enus/dnactdir/html/msdn_activedirvsnds.asp?frame=true, pp. 1-17.

Microsoft Corporation, "Introduction to Active Directory Application Mode," Microsoft Windows Server 2003, Aug. 2002, pp. 1-13.

Microsoft Corporation, "Using ADSI, LDAP, and Network Management Functions With Active Directory," [online], Feb. 2002 [retrieved on May 13, 2003]. Retrieved from the Internet http://msdn.microsoft.com/library/enus/dnactdir/html/BuildingADApps.asp?frame=true, pp. 1-9.

Neo Mai, Ken Neo. "Buying and selling on the internet; [Computimes, 2* Edition]." New Straits Times. Kuala Lumpur: Jun. 28, 2001, 3 pages.

Non-final Office Action from U.S. Appl. No. 09/810,159 mailed Jan. 29, 2010, 14 pages.

Notice of Allowability in U.S. Appl. No. 10/134,437, 3 pages.

Notice of Allowance and Fee(s) Due in U.S. Appl. No. 10/134,437 dated Oct. 2, 2009, 3 pages.

Office Action in U.S. Appl. No. 09/911,799 dated Jul. 3, 2007, 18 pages.

Office Action dated Sep. 18, 2008, in U.S. Appl. No. 10/134,437, 30 pages.

Office Action for U.S. Appl. No. 10/633,636 mailed Oct. 11, 2006, 9 pages.

Office Action issued on Jan. 8, 2008 in U.S. Appl. No. 10/184,002, 11 pages.

Office Action issued on Jan. 12, 2009 in U.S. Appl. No. 10/146,814, 19 pages.

Office Action issued on Feb. 11, 2008 in U.S. Appl. No. 10/134,437, 32 pages.

Office Action issued on Feb. 26, 2007 in U.S. Appl. No. 10/747,624, 15 pages.

Office Action issued on Mar. 10, 2009 in U.S. Appl. No. 10/134,437, 31 pages.

Office Action issued on Mar. 13, 2007 in U.S. Appl. No. 10/747,623, 17 pages.

Office Action issued on Mar. 18, 2010 in U.S. Appl. No. 09/911,799, 7 pages.

Office Action issued on Mar. 22, 2010 in U.S. Appl. No. 10/146,814, 13 pages.

Office Action issued on Mar. 28, 2006 in U.S. Appl. No. 09/843,788, 20 pages.

Office Action issued on Mar. 30, 2004 in U.S. Appl. No. 09/843,788, 14 pages.

Office Action issued on Apr. 2, 2009 in U.S. Appl. No. 11/237,718, 18 pages.

Office Action issued on Apr. 7, 2008 in U.S. Appl. No. 11/150,180, 7 pages.

Office Action issued on Apr. 15, 2008 in U.S. Appl. No. 10/146,814, 17 pages.

Office Action issued on Apr. 19, 2007 in U.S. Appl. No. 09/843,788, 14 pages.

Office Action issued on Apr. 20, 2006 in U.S. Appl. No. 10/184,002, 15 pages.

Office Action issued on Apr. 29, 2005 in U.S. Appl. No. 09/911,799, 16 pages.

Office Action issued on Apr. 29, 2008 in U.S. Appl. No. 10/747,679, 22 pages.

Office Action issued on May 5, 2010 in U.S. Appl. No. 09/843,788, 17 pages.

Office Action issued on May 18, 2006 in U.S. Appl. No. 10/134,437, 26 pages.

Office Action issued on May 22, 2006 in U.S. Appl. No. 10/146,814, 11 pages.

Office Action issued on Jun. 12, 2006 in U.S. Appl. No. 09/843,788, 3 pages.

Office Action issued on Jun. 23, 2008 in U.S. Appl. No. 10/747,623, 18 pages.

Office Action issued on Jul. 2, 2007 in U.S. Appl. No. 10/146,814, 15 pages.
Office Action issued on Jul. 16, 2007 in U.S. Appl. No. 10/747,624, 7 pages.
Office Action issued on Jul. 27, 2005 in U.S. Appl. No. 09/843,788, 19 pages.
Office Action issued on Aug. 4, 2010 in U.S. Appl. No. 12/336,880, 12 pages.
Office Action issued on Aug. 11, 2006 in U.S. Appl. No. 09/911,799, 13 pages.
Office Action issued on Aug. 19, 2009 in U.S. Appl. No. 11/150,180, 11 pages.
Office Action issued on Aug. 21, 2006 in U.S. Appl. No. 10/134,437, 3 pages.
Office Action issued on Aug. 21, 2007 in U.S. Appl. No. 10/747,623, 6 pages.
Office Action issued on Aug. 25, 2005 in U.S. Appl. No. 10/184,002, 13 pages.
Office Action issued on Sep. 6, 2007 in U.S. Appl. No. 10/134,437, 2 pages.
Office Action issued on Sep. 15, 2008 in U.S. Appl. No. 09/843,788, 12 pages.
Office Action issued on Sep. 18, 2008 in U.S. Appl. No. 10/134,437, 30 pages.
Office Action issued on Sep. 20, 2005 in U.S. Appl. No. 10/146,814, 11 pages.
Office Action issued on Oct. 2, 2007 in U.S. Appl. No. 10/747,679, 27 pages.
Office Action issued on Oct. 2, 2007 in U.S. Appl. No. 11/150,180, 5 pages.
Office Action issued on Oct. 31, 2007 in U.S. Appl. No. 09/843,788, 3 pages.
Office Action issued on Nov. 1, 2005 in U.S. Appl. No. 10/134,437, 21 pages.
Office Action issued on Nov. 1, 2007 in U.S. Appl. No. 10/747,624. 17 pages.
Office Action issued on Nov. 14, 2007 in U.S. Appl. No. 10/747,623, 20 pages.
Office Action issued on Nov. 17, 2005 in U.S. Appl. No. 09/911,799, 12 pages.
Office Action issued on Nov. 17, 2009 in U.S. Appl. No. 10/134,437, 2 pages.
Office Action issued on Dec. 2, 2004 in U.S. Appl. No. 09/843,788, 21 pages.
Office Action issued on Dec. 11, 2006 in U.S. Appl. No. 10/146,814, 14 pages.
Office Action of Canadian Application No. 2,462,037. dated Feb. 12, 2009, 8 pages.
Office Action in U.S. Appl. No. 10/134,437, dated Mar. 10, 2009, 31 pages.
Office Action in U.S. Appl. No. 10/184,002, dated Jan. 8, 2008, 11 pages.
Office Action in U.S. Appl. No. 10/184,002, dated Jan. 9, 2007, 9 pages.
Office Action in U.S. Appl. No. 11/015,424, dated Mar. 19, 2008, 32 pages.
Office Action in U.S. Appl. No. 11/015,424, dated May 1, 2009, 46 pages.
Office Action in U.S. Appl. No. 11/237,718, dated Apr. 2, 2009, 19 pages.
Office Action in U.S. Appl. No. 11/238,130, dated Apr. 14, 2009, 35 pages.
Office Action in U.S. Appl. No. 11/238,130, dated Jul. 3, 2008, 19 pages.
Office Action in U.S. Appl. No. 11/238,130, dated Nov. 13, 2008, 44 pages.
Office Action in U.S. Appl. No. 09/843,788, dated Apr. 19, 2007, 14 pages.
Office Action in U.S. Appl. No. 10/134,437, dated Feb. 11, 2008, 32 pages.
Office Action in U.S. Appl. No. 10/146,814, dated Apr. 15, 2008, 17 pages.
Office Action in U.S. Appl. No. 10/146,814, dated Dec. 11, 2006, 14 pages.
Office Action in U.S. Appl. No. 10/146,814, dated Jul. 2, 2007, 15 pages.
Office Action in U.S. Appl. No. 10/184,002 dated Jan. 9, 2007, 9 pages.
Office Action in U.S. Appl. No. 10/747,623, dated Mar. 13, 2007, 19 pages.
Office Action in U.S. Appl. No. 10/747,623, dated Nov. 14, 2007, 18 pages.
Office Action in U.S. Appl. No. 10/747,624, dated Feb. 26, 2007, 15 pages.
Office Action in U.S. Appl. No. 11/150,180, dated Oct. 2, 2007, 6 pages.
PCT International Search Report of Apr. 11, 2003, App. No. PCT/US00/35160 (3 pages).
PCT International Search Report of Jan. 9, 2003, App. No. PCT/US02/30730 (5 pages).
Pruitt, Scarlet. IDG News Service. "Morpheus Updates Peer-to-Peer Client" [online] Jun. 10, 2002, Retrieved from Internet URL:http://www.pcworld.com/article/id.101736/article.html, 1 page.
R. Movva & W. Lai, "MSN Messenger Service 1.0 Protocol", Aug. 1999. Internet Draft. http://tools.ietf.org/id/draft-movva-msn-messenger-protocol-oo.txt, 28 pages.
Reichard, K., "AOL, ICQ to Interoperate—But in a Limited Fashion," Oct. 30, 2002, InstantMessagingPlanet, available at www.instantmessagingplanet.com/public/article.php/1490771, 4 pages.
Ryze home page, www.ryze.com, Dec. 21, 2003, available at http://web.archive.org/web/20031221010006/http://ryze.com, 13 pages.
Takashi Yoshino et al., "Namba: Location-Aware Collaboration System for Shopping and Meeting", Aug. 2002, IEEE Transactions on Consumer Electronics, pp. 470-477.
The LP Wireless Messenger, Messenger Documentation, [online]. LP Wireless, Inc., 2001. Retrieved from the Internet <http://www.lpwireless.com/messengerhelp.htm> pp. 1-7.
Tribal Voice, PowWow Guided Tour—Step 6, PowWow personal communication. http://web.archive.org/web/2000817094516/www.tribal.com/powwow/tour/step6.cfm (Oct. 22, 1999), 2 pages.
Final Office Action in U.S. Appl. No. 10/134,437 dated May 18, 2006, 26 pages.
Final Office Action in U.S. Appl. No. 11/238,130 dated Nov. 24, 2009, 26 pages.
Final Office Action in U.S. Appl. No. 10/015,424 dated Nov. 3, 2008, 46 pages.
Final Office Action in U.S. Appl. No. 10/015,424 dated Oct. 19, 2009, 59 pages.
Final Office Action in U.S. Appl. No. 11/237,718 dated Oct. 30, 2009, 21 pages.
Office Action in U.S. Appl. No. 10/184,002 dated Apr. 20, 2006, 15 pages.
Office Action in U.S. Appl. No. 10/184,002 dated Aug. 25, 2005, 13 pages.
Office Action in U.S. Appl. No. 10/134,437 dated Nov. 1, 2005, 21 pages.
VisiblePath webpages, www.visiblepath.org, Dec. 3, 2003, available at http://web.archive.org/web/20031203132211/http://www.visiblepath.com., 5 pages.
WebmasterWorld.com Inc., "HTML and Browsers", Mar. 5, 2001, Internet: www.webmasterworld.com/forum21/367.htm, 2 pages.
William R. Stanek, Microsoft Windows 2000 Administrator's Pocket Consultant [online]. Microsoft Corporation, 1999, Working with Active Directory Domains, pp. 1-10.
William R. Stanek, Microsoft Windows 2000 Administrator's Pocket Consultant [online]. Microsoft Corporation, 1999, .Using Active Directory Service pp. 1-6.
ZeroDegrees home page, www-zerodegrees.com, Jan. 24, 2004, available at http://web.archive.org/web/20040204153037/www.zerodegrees.com/home.htm, printed Mar. 16, 2005, 2 pages.
Archive.org archived the Morpheus 1.9.1 download page on clnet Download.com [online] Oct. 8, 2001 [from file of U.S. Appl. No. 09/911,799] (2 pages).

Archive.org archived the MusicCity Morpheus download page on clnet Download.com [online] Oct. 8, 2001 [from file of U.S. Appl. No. 09/911,799] (2 pages).
Mariano, Gwendloyn, ZDNet News, "Morpheus 1.9 to be unleashed" [online] Jun. 10, 2002 [from file of U.S. Appl. No. 09/911,799] (6 pages).
Pruitt, Scarlet, IDG News Service, "Morpheus Updates Peer-to-Peer Client" [online] Jun. 20, 2002 [from file of U.S. Appl. No. 09/911,799] (3 pages).
Yubing Wang, Mark Claypool, Zheng Zoo, Video: An empirical study of relavideo performance across the internet, Proceedings of the 1st ACM SIGCOMM Workshop on Internet Measurement, ACM Press, IMW 2001, Nov. 2001 (15 pages).
Office Action mailed Approximately Feb. 19, 2006, for Japanese Patent App. No. 2002-515026 (6 pages).
Archive.org archived "AOL Instant Messenger," [online] Jul. 21, 2001 [from file of U.S. Appl. No. 09/911,799] (7 pages).
Archive.org archived "About File Transfers," AOL Instant Messenger, version 4.3, Help Documentation [online] Jul. 21, 2001 [from file of U.S. Appl. No. 09/911,799] (5 pages).
Office Action mailed Nov. 14, 2007, from U.S. Appl. No. 10/747,623 (18 pages).
Final Office Action mailed Aug. 21, 2007, from U.S. Appl. No. 10/747,623 (17 pages).
Office Action mailed Mar. 13, 2007, from U.S. Appl. No. 10/747,623 (18 pages).
Final Office Action mailed Jun. 23, 2008, from U.S. Appl. No. 10/747,623 (19 pages).
Office Action mailed Feb. 26, 2007, from U.S. Appl. No. 10/747,624 (15 pages).
Final Office Action mailed Nov. 1, 2007, from U.S. Appl. No. 10/747,624 (17 pages).
Office Action of Dec. 1, 2008, from U.S. Appl. No. 09/911,799 (8 pages).
Office Action mailed Jul. 3, 2007, from U.S. Appl. No. 09/911,799 (18 pages).
Final Office Action mailed Mar. 18, 2009, from U.S. Appl. No. 09/911,799 (28 pages).
Office Action mailed Mar. 18, 2010, from U.S. Appl. No. 09/911,799 (6 pages).
Final Office Action mailed Aug. 11, 2006, from U.S. Appl. No. 09/911,799 (12 pages).
Office Action mailed Nov. 17, 2005, from U.S. Appl. No. 09/911,799 (11 pages).
Final Office Action mailed Apr. 29, 2005, from U.S. Appl. No. 09/911,799 (15 pages).
Office Action mailed Oct. 5, 2004, from U.S. Appl. No. 09/911,799 (12 pages).
Office Action mailed Oct. 2, 2007, from U.S. Appl. No. 10/747,679 (33 pages).
Final Office Action mailed Apr. 29, 2008, from U.S. Appl. No. 10/747,697 (23 pages).
Wingfield, N., "Technology Journal: Changing Chat—Instant Messaging is Taking Off, and for Some Users It's Nuzzling Out the Phone," Asian Wall Street Journal, New York, N. Y., Sep. 25, 2000 (5 pages).
"Windows Meeting—Features," [Online] Jun. 17, 1999, XP002245623 retrieved from the Internet: URL http://www.microsoft.com/windows/NetMeeting/features/default.ASP> (8 pages).

European Office Action in Application No. 01954931.0-2414, mailed Jul. 14, 2008 (3 pages).
WBWE (1998). PowWow 3.5 Brings the Power of Internet Community to the People, Business Wire.
PowWow (Mar. 1, 2000). Introduction, retrieved Apr. 3, 2006 from Web site: http://web.archive.org/web/20000301125635/ww2.tribal.com/help/online_docs/h205voic.html.
Canadian Office Action from Application No. 2,403,520, dated Feb. 21, 2005.
Satter, Michael, excerpts from Internet TV with CU-SeeMe, First Edition, including inside Title Page and Copyright Page; "Overview" & "Contents," through pp. xii; Chapter 1, "Introduction to Internet Video Conferencing and CU-SeeMe," pp. 1-12; Chapter 4, "Hardware," pp. 47-64; Chapter 5, "Software," pp. 65.92; Chapter 6, "CU-SeeMe User's Guide," pp. 93-121; Chapter 9, "Other Videoconferencing Technologies," pp. 201-226; Chapter 10, "What the Future Holds," pp. 227-233 and Appendix A, "Troubleshooting Q&A," pp. 235-249; published by Sams.net Publishing, 201 W. 103rd Street, Indianapolis, IN 46290, International Standard Book No. 1-57521-006-1, Library of Congress Catalog Card No. 95-70178, copyright 1995.
Anonymous, "The Internet—the Advent of New Forms of Communication," Internet Document, pp. 1-4, retrieved from URL http://journal.fujitsu.com/248e/e48now.html [retrieved Dec. 29, 2003].
Anonymous, "Push to Talk Services," Internet Document, p. 1, retrieved from URL http://www.nextel.com/services/directconnect/ppt_overview.shtml [retrieved on Dec. 29, 2003].
Isaacs, Ellen: "Example UI Spec: Sound Instant Messages," Internet Document, pp. 1-2, retrieved from URL http://www.udesigns.com/spec/d-sims.html [retrieved on Jun. 26, 2003].
Matsumoto, Tatsuro et al., Chocoa Communicator—A New Communication System Based on Awareness and Text Communications—FUJITSU Sci. Tech. J., 36, pp. 154-161 (Dec. 2000).
Muller, Nathan, "Dial 1-800-Internet," Feb. 1996, pp. 83-84, 86, 88.
Wayner, Peter, "Hey Baby, Call Me at My IP Address," Apr. 1996, pp. 142-144.
"AOL Technology: Turning Complicated Things Into Engaging Services," 1996 Annual Report, 22 pages.
Mike Snider, "America Goes Online for New Year's Bash," USA Today, p. 3D, Jan. 2, 2000.
"Yahoo! Messenger Makes the World a Little Smaller, More Informed," pp. 1-2, Jun. 21, 1999.
Klaus Hartenstein et al, "xhtalk 2.9," Nov. 1992 (6 pages).
Alan Cohen, "Instant Messaging," Apr. 13, 1999, PC Magazine, PC Labs (2 pages).
"AOL Instant Messenger Windows Beta Features," Jun. 24, 1999 (2 page); AOL Instant Messenger All New Version 2.0 (2 pages), Jun. 24, 1999, What is AOL Instant Messenger (3 pages), Jun. 24, 1999; Quick Tips.
Final Office Action, U.S. Appl. No. 11/023,652, issued Dec. 8, 2011 (13 pages).
Office Action, U.S. Appl. No. 12/615,136, issued Oct. 25, 2011 (19 pages).
Final Office Action, U.S. Appl. No. 13/023,256, issued Nov. 28, 2011 (11 pages).

* cited by examiner

VOICE INSTANT MESSAGING

This application is a continuation of U.S. application Ser. No. 09/810,159, filed Mar. 19, 2001 now U.S. Pat. No. 8,041,768, which claims the benefit of U.S. Provisional Application No. 60/189,974, filed Mar. 17, 2000, and U.S. Provisional Application No. 60/239,917, filed Oct. 13, 2000. The foregoing applications are expressly incorporated herein by reference in their entirety.

TECHNICAL FIELD

The present invention relates generally to transferring data between subscribers of a communications system and more particularly to transferring audio data between subscribers of an instant messaging host.

BACKGROUND

Online service providers are constantly offering new services and upgrading existing services to enhance their subscribers' online experience. Subscribers have on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from servers located throughout the world. A server may be maintained by the service provider or by a third party provider who makes information and services available through the worldwide network of computers that make up the online service.

America Online has provided subscribers with the ability to send and receive instant messages. Instant messages are private online conversations between two or more people who have subscribed to the instant messaging service and have installed the necessary software. Because such online conversations take place in essentially real time, instant messaging can provide immediate access to desired information. Instant messaging is becoming a preferred means of communicating among online subscribers.

SUMMARY

In one general aspect, electronic data is transferred between users of a communications system by enabling instant messaging communication between a sender an at least one recipient through an instant messaging host. In addition, voice communication is enabled between the sender and the recipient through the instant messaging host.

Implementations may include one or more of the following features. For example, implementations may include receiving and authenticating a text instant message from the sender at the instant messaging host; determining capabilities of the recipient; reporting the capabilities of the recipient; receiving a request to establish voice communication from the sender and/or the recipient; and/or authenticating the request. Authenticating may include identifying a screen name and/or an EP address of the sender and/or the recipient. Determining capabilities of the recipient may include identifying hardware or software associated with the recipient. A user interface may be displayed according to the capabilities of the recipient.

Voice communication may be enabled by establishing a generic signaling interface channel, a control channel, and an audio channel between the sender and the recipient. A mode UDP test may be attempted on the audio channel. The control channel may include a TCP/IP socket. The audio channel may include a UDP or TCP channel.

These and other general aspects may be implemented by an apparatus and/or by a computer program stored on a computer readable medium. The computer readable medium may comprise a disc, a client device, a host device, and/or a propagated signal.

Other features and advantages will be apparent from the following description, including the drawings, and from the claims.

DETAILED DESCRIPTION

For illustrative purposes, FIGS. 1-5 describe a communications system for implementing techniques for transferring electronic data. For brevity, several elements in the figures described below are represented as monolithic entities. However, as would be understood by one skilled in the art, these elements each may include numerous interconnected components and components designed to perform a set of specified operations and/or dedicated to a particular geographical region.

Figure 1:
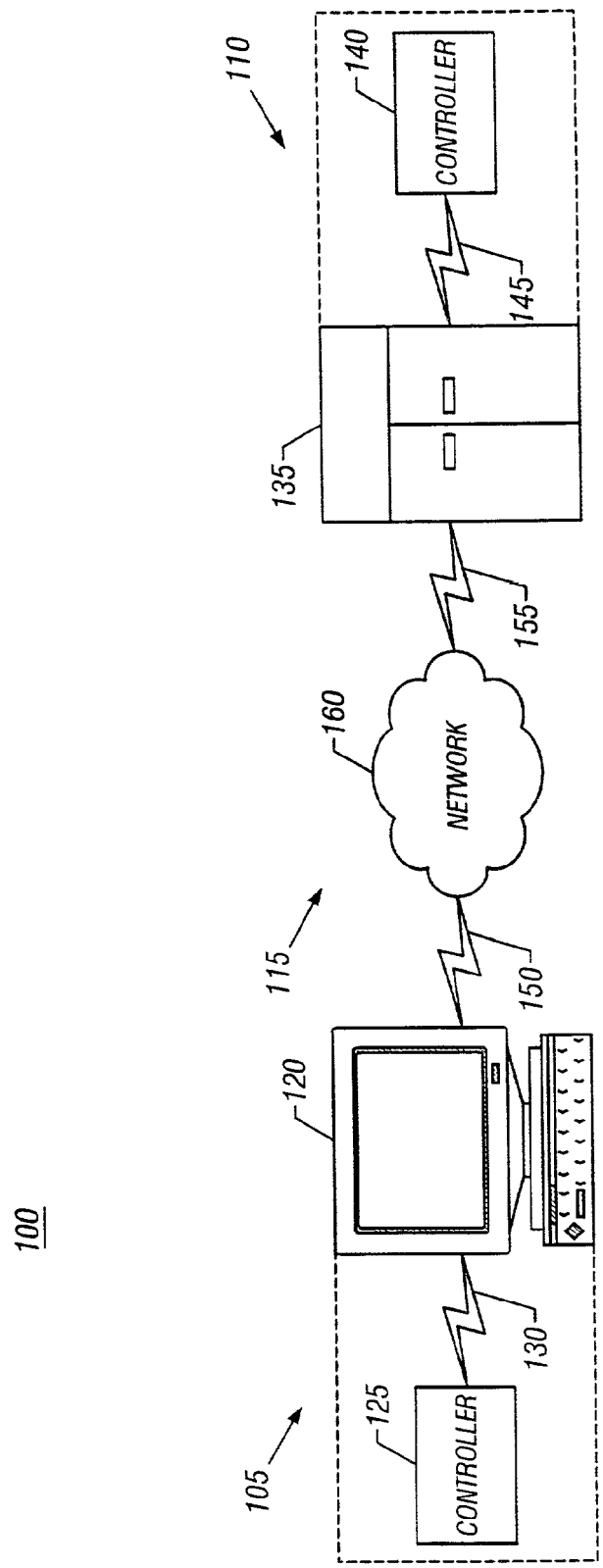
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, or xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless, data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
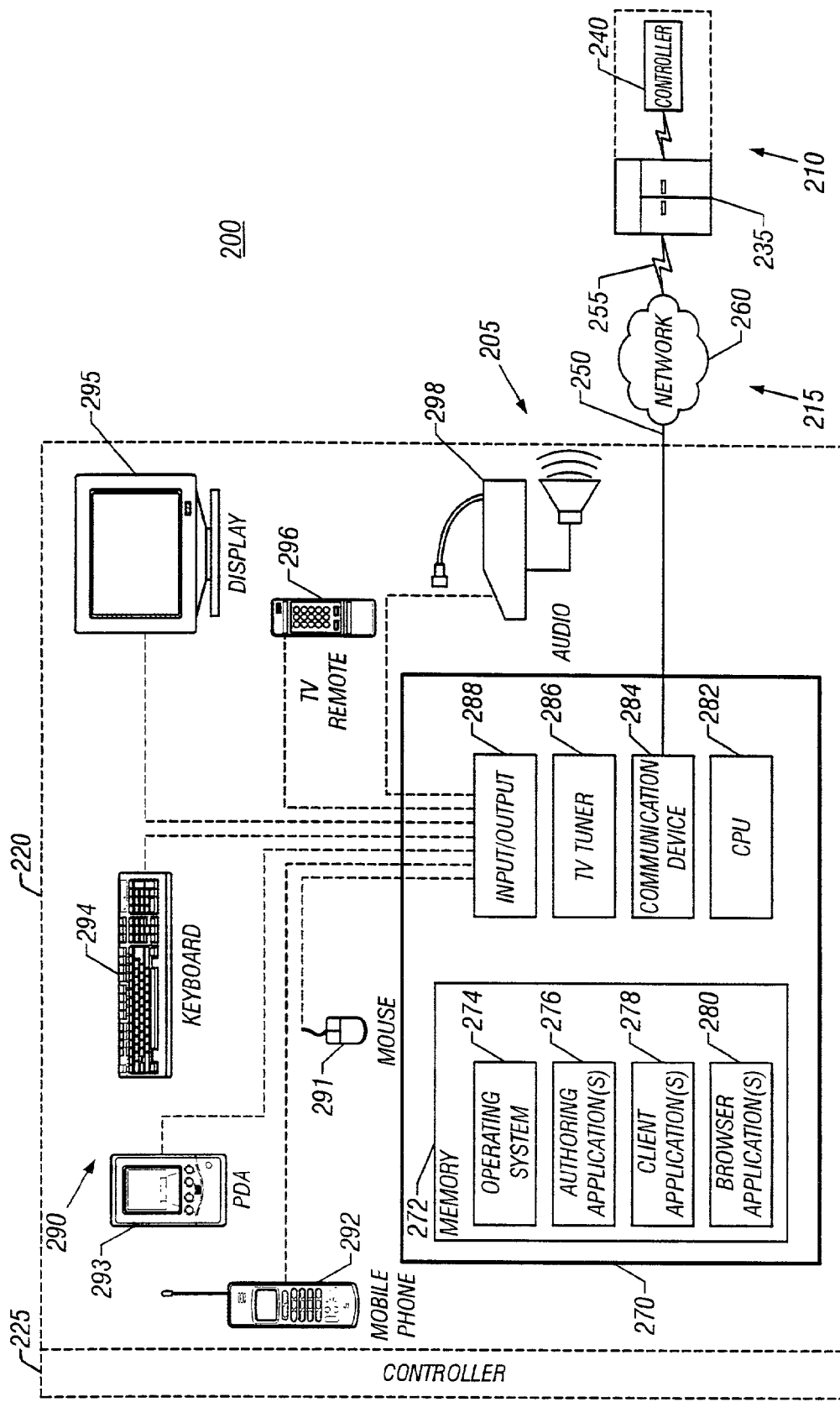
FIGS. 2-5 are expansions of the block diagram of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system (e.g., DOS, Windows™, Windows95™, Windows98™, Windows2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central, processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, a TV remote control 296 for receiving information from and rendering information to subscribers, and a video input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
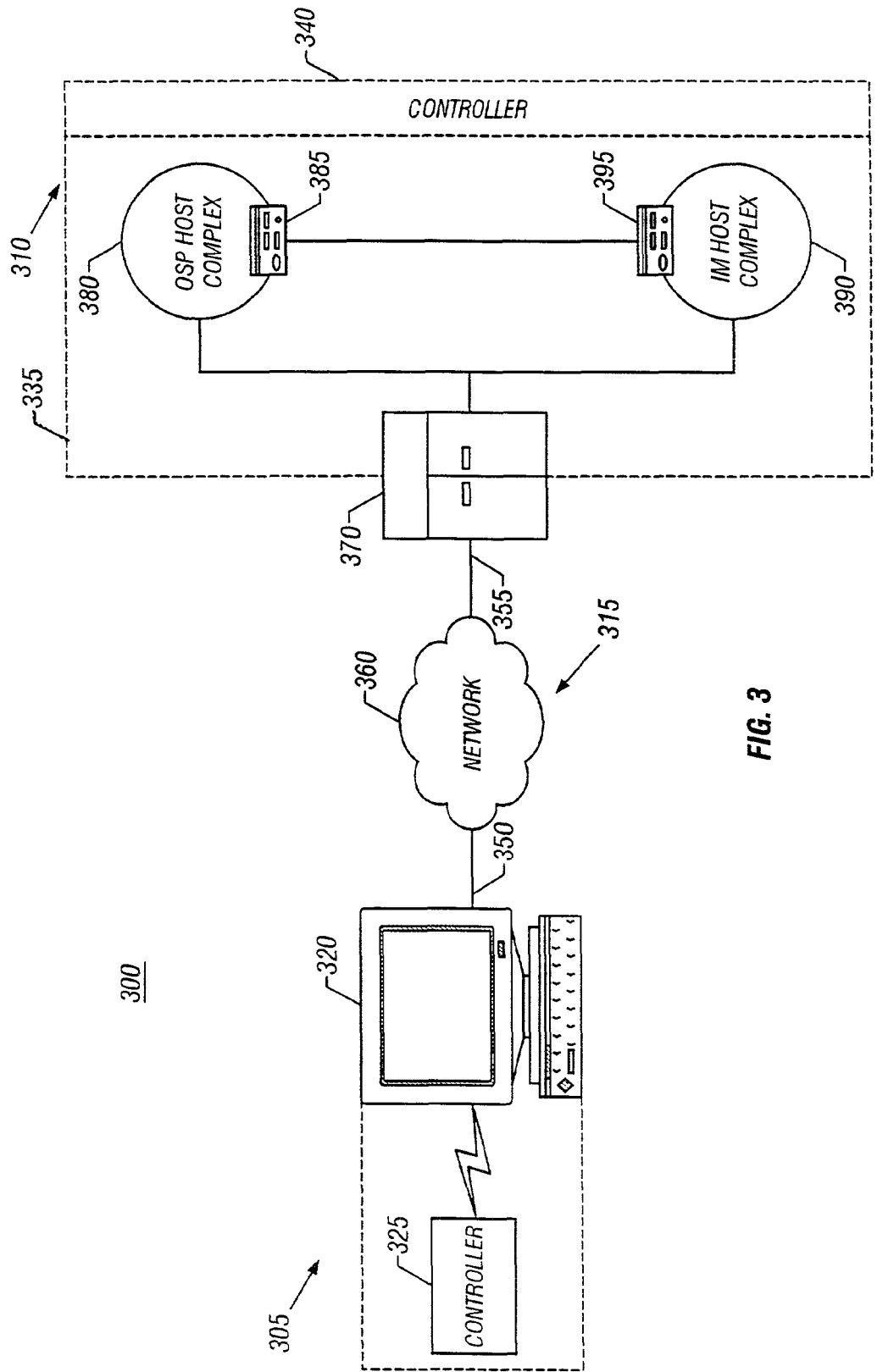

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
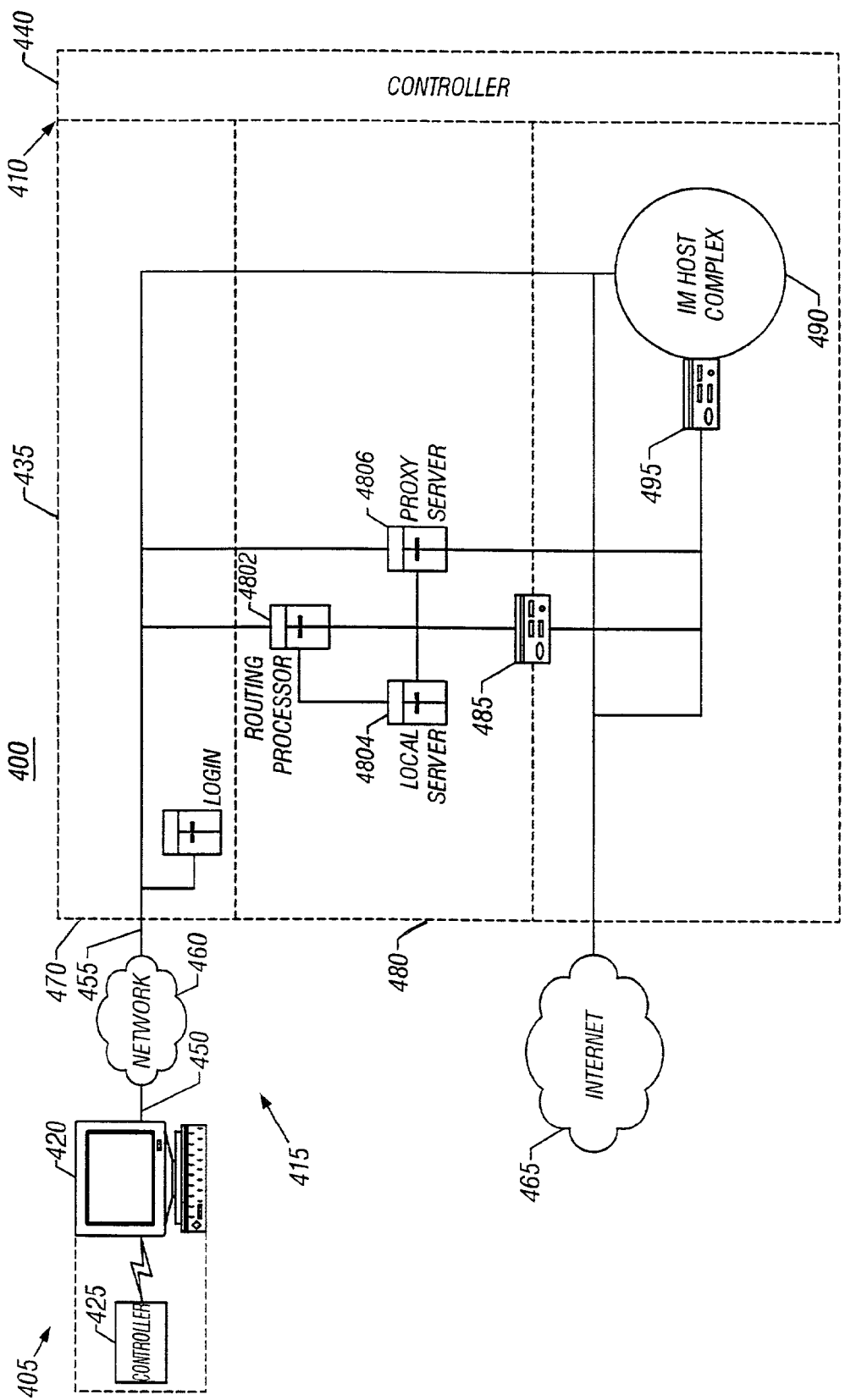

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible embodiment of the host systems 110, 210, and 310 shown in FIGS. 1-3, respectively. However, FIG. 4 describes an aspect of the host system 410, focusing primarily on one particular implementation of OSP host complex 480. For purposes of communicating with an OSP host complex 480, the delivery network 460 is generally a telephone network.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the DA host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In the implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465 through. The proxy server 4802 may include an IP ("Internet Protocol") tunnel for converting data from OSP protocol into standard Internet protocol and transmitting the data to the Internet 465. The IP tunnel also converts data received from the Internet in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include a L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
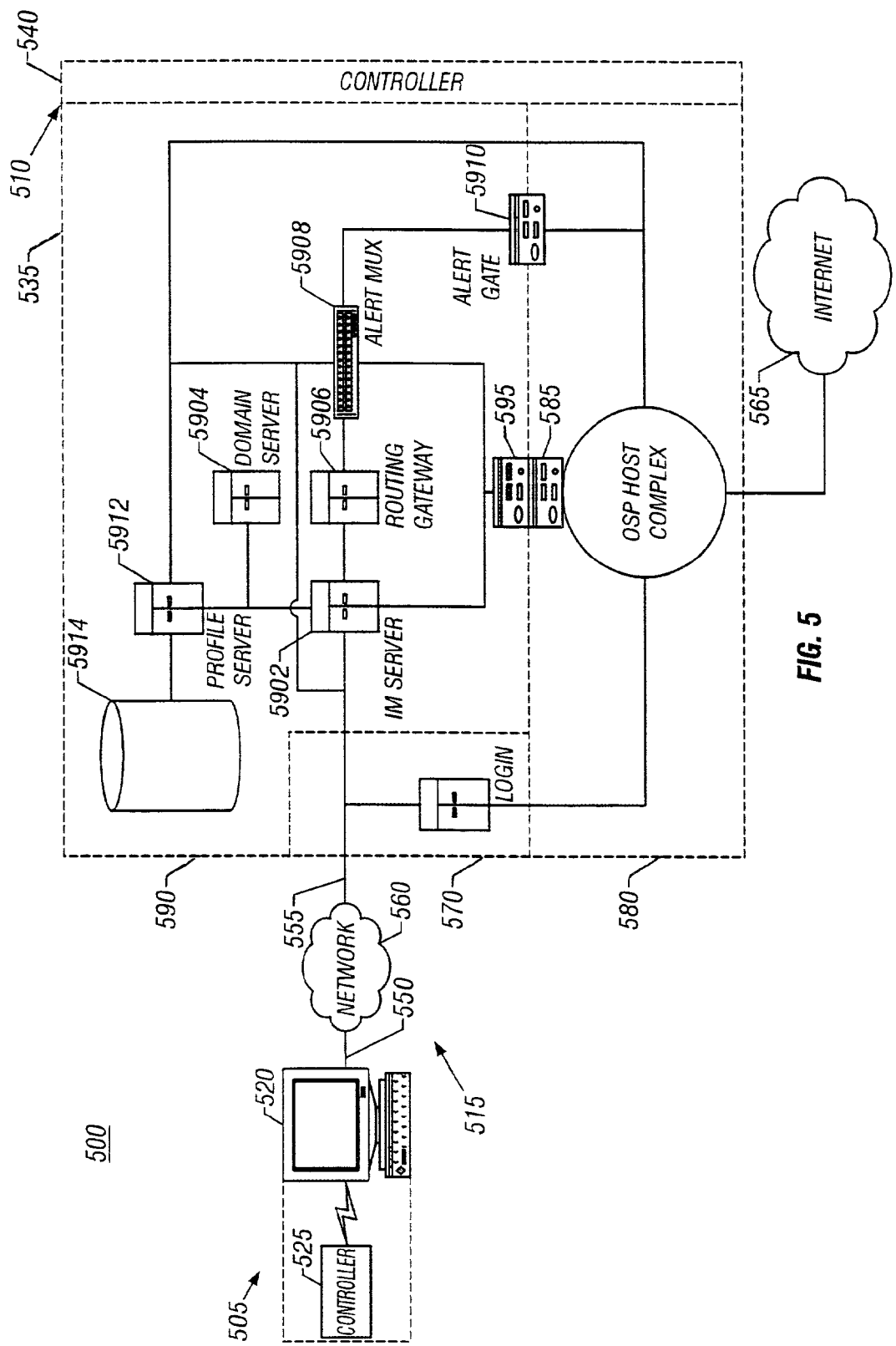

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible embodiment of the host systems 110, 210, 310, and 410 shown in FIGS. 1-4, respectively. However, FIG. 5 describes an aspect of the host system 510, focusing primarily on one particular implementation of IM host complex 590. For purposes of communicating with the IM host complex 590, the delivery network 560 is generally a telephone network.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex

590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers to several alert multiplexors. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
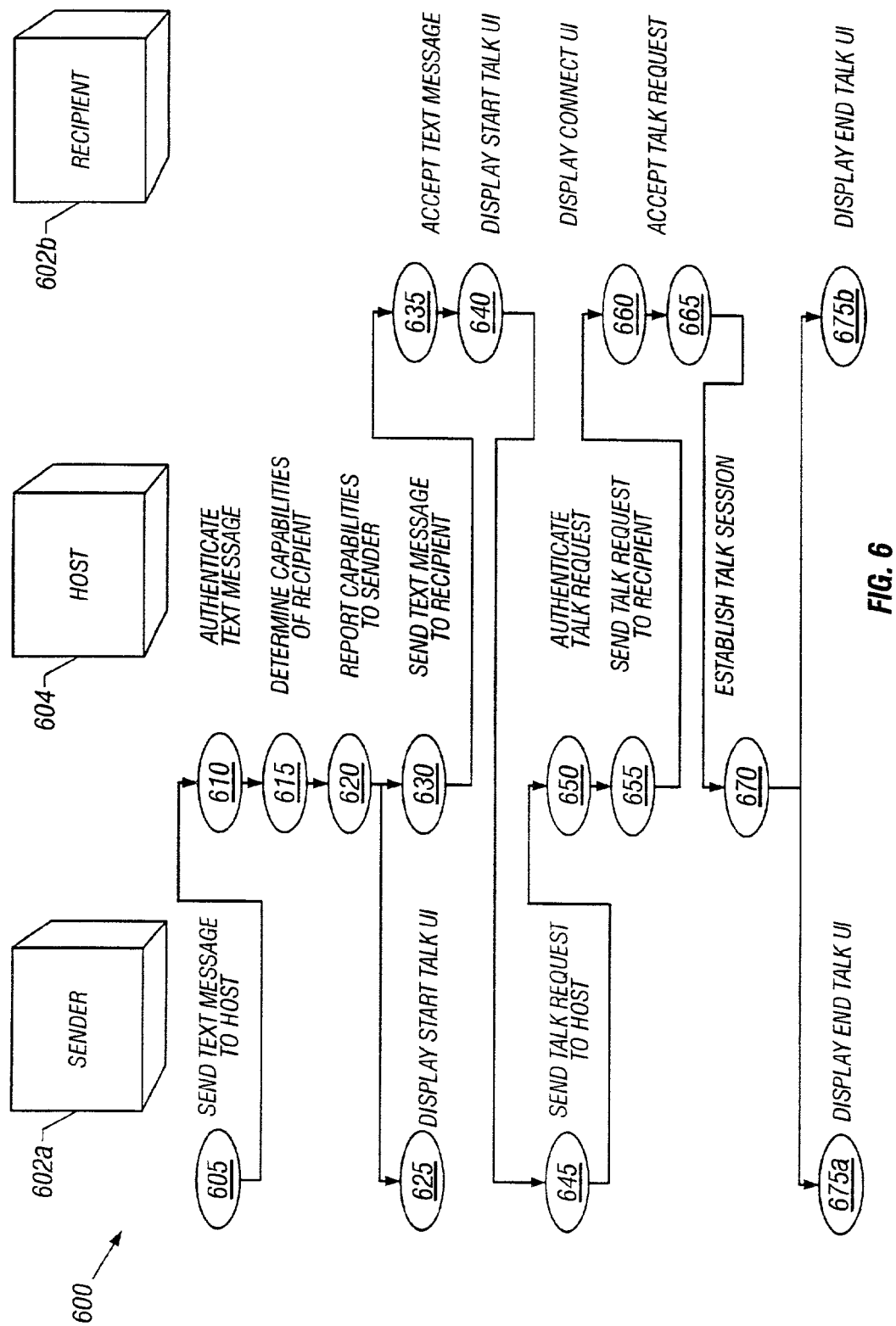
FIG. 6 is a flow chart of a communications method that may be implemented by the systems of FIGS. 1-5.

Referring to FIG. 6, a sender 602a, a recipient 602b, and a host 604 interact according to a procedure 600 to transfer audio data. The procedure 600 may be implemented by any suitable type of hardware, software, device, computer, computer system, equipment, component, program, application, code, storage medium, or propagated signal.

Examples of each element of FIG. 6 are broadly described above with respect to FIGS. 1-5. In particular, the sender 602a and the recipient 602b typically have attributes comparable to those described with respect to client devices 120, 220, 320, 420, and 520 and/or client controllers 125, 225, 325, 425, and 525. The host 604 typically has attributes comparable to those described with respect to host device 135, 235, 335, 435, and 535 and/or host controllers 140, 240, 340, 440, and 540. The sender 602a, the recipient 602b, and/or the host 604 may be directly or indirectly interconnected through a known or described delivery network.

The sender 602a and the recipient 602b are each associated with a subscriber. To allow file transfers, each subscriber sets certain preferences for permitting files to be transferred to and from other subscribers. For example, the sender and recipient may identify screen names of subscribers who have permission to send files to them or retrieve files from them. Typically, each subscriber will be presented with a graphical user interface that permits selection among various transfer preferences. A subscriber's transfer preferences may be maintained locally at the client or remotely at the host 604.

In general, the sender 602a and the recipient 602b communicate over an open connection, such as an open TCP connection established through the host 604. Typically, the sender 602a and the recipient 602b each include a Winsock API for establishing an open TCP connection to the host 604 and a client application for accessing the host 604. The sender 602a and the recipient 602b connect to the host 604 to establish the connection.

The sender 602a and the recipient 602b use the connection to communicate with the host 604 and with each other. The connection remains open during the time that the sender 602a and the recipient 602b are accessing the host 604. To access the host 604, the sender 602a and the recipient 602b each send a separate request to the host 604. The request identifies the associated subscriber to the host 604 and to other subscribers using a unique screen name. The host 604 verifies a subscriber's information (e.g., screen name and password) against data stored in a subscriber database. If the subscriber's information is verified, the host 604 authorizes access. If the subscriber's information is not verified, the host 604 denies access and sends an error message.

Upon accessing the host 604, a "buddy list" is displayed to the subscriber. In general, a subscriber's buddy list is a user interface that lists the online status and capabilities of certain screen names, i.e., "buddies", identified the subscriber. In particular, the host 604 informs the sender whether identified buddies are online, i.e., currently accessing the host 604. The host 604 also informs any subscriber who has identified the sender as a buddy that the sender is currently online. The buddy list also facilitates instant messaging communication between subscribers. A subscriber can activate an instant messaging message user interface pre-addressed to a buddy simply by clicking the screen name of a buddy on the buddy list. If a recipient is not a "buddy," the first subscriber must activate a blank instant messaging user interface and then address the instant message to the screen name of the intended recipient. When necessary, a subscriber can look up the screen name of an intended recipient using the intended recipient's e-mail address.

In addition to exchanging instant messages with online buddies, the sender may participate in group chat rooms, locate other subscribers with similar interests, get customized news and stock quotes, search the Web, and transfer files to and from other subscribers. In one implementation, a sender 602a, a recipient 602b, and a host 604 interact according to a procedure 600 to transfer audio data.

The transfer of audio data extends the functionality of instant messaging by allowing the sender 602a and the recipient 602b to communicate peer to peer via audio, i.e., microphone and speaker. In one implementation, the sender initiates the process 600 by designating one or more recipients to receive an instant message (e.g., a text message). If the intended recipients are "buddies" of the sender 602a, the sender 602a may confirm the online status and capabilities of each recipient prior to sending the video message by viewing the "buddy list." After a subscriber composes an instant message and clicks a SEND button, the instant message is sent from the sender 602a to the host (step 605).

After receiving the instant message from the sender 602a, the host 604 authenticates the instant message (step 610). In addition to the textual body, the instant message may include header information identifying the message type, the screen name and/or IP address of the sender and recipient, and a randomly generated security number. The instant message may be authenticated by, for example, using a reverse look-up table to match the screen names and/or IP addresses with those of valid subscribers. In the event that either the sender 602a or the recipient 602b is not associated with a valid subscriber, the host 604 reports an error message.

Once the instant message is verified, the host 604 determines the capabilities of the recipient (step 615). For example, the host 604 may monitor and update the online status, client version, and device type of all connected subscribers in real time. The capability to receive audio data may depend on hardware (e.g., device type), software (e.g., client version), and/or transfer preferences (e.g., blocked screen names). To be talk enabled, both the talk software and audio equipment must be available. The host 604 then reports the capabilities of the recipient to the sender (step 620).

Upon receiving the report from the host 604, the sender 602a displays a UI according to the capabilities of the sender and/or the recipient 602b (step 625). If the sender 602a is not talk enabled, then a standard instant messaging user interface is displayed. If the sender 602a is talk enabled, but the recipient 602b is not talk enabled, a START TALK UI having a grayed START TALK button is displayed. If both the sender 602a and the recipient 602b are talk enabled, a START TALK UI having a functioning START TALK button is displayed.

The process 600 continues with the host 604 sending the instant message to the recipient 602b (step 630). The recipient 602b accepts the initial text message from the host 604 (step 635) and displays a UI according to the capabilities of the sender 602a and/or the recipient 602b (step 640). If the recipient 602b is not talk enabled, then a standard instant messaging UI is displayed. If the recipient 602b is talk enabled, but the sender 602a is not talk enabled, an instant messaging UI having a grayed START TALK button is displayed. If both the recipient 602b and the sender 602a are talk enabled, an instant messaging UI with a functioning START TALK button is displayed.

If both sides are talk enabled, both the sender 602a and the recipient 602b have a START TALK UI displayed. When the START TALK UI is displayed, a subscriber can initiate a talk session. In one implementation, the sender 602a initiates a talk session by sending a talk request to the host 604 (step 645). The talk request may contain information including, but not limited to, the message type, the screen name and/or IP address of the sender and recipient, and a randomly generated security number. When a sender 602a clicks the START TALK UI, the START TALK UI transitions to an END TALK UI.

Upon receiving the talk request, the host 604 authenticates the talk request from the sender 602a (step 650). The host 604 may authenticate the talk request by, for example, using a reverse look-up table to match the screen names and/or IP addresses with those of valid subscribers. In the event that either the sender 602a or the recipient 602b is not associated with a valid subscriber, the host 604 reports an error message.

After verifying the talk request, the host 604 sends the talk request to the recipient 602b (step 655). Upon receiving the talk request, the START TALK UI displayed by the recipient 620b transitions to a CONNECT UI (step 660). The CONNECT UI informs the recipient 602b that the sender 602a wants to engage in a talk session. At this point, the recipient 602b may ignore the talk request, accept the talk request, or terminate the instant message session.

If the recipient 602b accepts the talk request by clicking the CONNECT UI (step 665), the CONNECT UI transitions to the END TALK UI and the host 604 establishes a talk session (step 670). When a talk session is active, users can talk to each other. At this point, END TALK UI is displayed by both the sender 602a and the recipient 602b. The talk session (steps 675a-b) remains active until one of the users clicks END TALK UI. After one of the users clicks the END TALK UI, both the sender 602a and the recipient 602b will display the START TALK UI, allowing either side to initiate yet another talk session.

If the sender 602a disengages from the talk session before the recipient connects, the CONNECT UI at the recipient 602b transitions back to the START TALK UI. If both users click the START TALK UI simultaneously, the host will ignore one of the START TALK clicks such that one user will display the END TALK UI and the other will display the CONNECT UI. If the sender clicks the START TALK UI prior to the recipient 602b accepting the initial text message, the recipient 602b does not display the START TALK UI, but instead immediately displays the CONNECT UI.

In one implementation, a talk tool establishes an active talk session using three communication channels: a Generic Signaling Interface (GSI) channel, a control channel, and an audio channel. The talk tool uses the GSI channel to establish the initial connection. During this connection, the local IP addresses are exchanged. After the initial connection phase is done, the GSI channel is no longer used. By using the GSI channel, the exchange of local IP addresses is only done when both users permit such an exchange, i.e., by clicking on the CONNECT UI. These actions protect users from having their local EP addresses automatically obtained without their consent.

The control channel is a TCP/IP socket, for which the IP address and port number of the remote side are obtained through the GSI channel. The control channel is used to send/receive control attributes of the talk session while the session is active. For example, because some firewalls will not allow an external connection to a socket on the inside of the firewall, the talk tool attempts a connection from both sides of the session. This action allows a connection to be made if there is a maximum of one firewall within the connection. If there is a firewall on both sides, the chances are that no connection can be made and the talk session will fail. To work across two firewalls, the user must obtain the port range used by talk such that one of the firewalls can be modified to permit the range to pass through the firewall.

The audio channel is a TCP/IP socket used to transport audio packets. This channel can either be UDP or TCP. In general, UDP is used since it minimizes latency. However, because some firewalls will not pass through UDP packets, the audio channel may have to use TCP. The talk tool indicates the mode (i.e., TCP, UDP), or employs an auto mode in which the talk tool attempts a UDP test and resorts to TCP upon failure of UDP.

Talk sessions may work in either full half duplex. Full duplex is when both users can talk at the same time. Half duplex is where only one user can talk at a time. A client device is determined to be incapable of handling full duplex, for example, if the CPU is too slow to compress/decompress audio simultaneously and/or the microphone and speakers cannot be opened simultaneously. If a client device is marked as half duplex, then any talk session used by that client device becomes a half duplex session, regardless of whether another device can handle duplex mode. In one implementation, a TALK/LISTEN button on the END TALK UI supports half duplex operation. This button has two states: LISTEN or TALK. If the talk session is full duplex, this button is not shown. If the button reads TALK at both the sender 602a and the recipient 602b (Initial Half Duplex), the first user to click TALK is allowed to talk and the other user is forced to listen. The user who is listening has a grayed out TALK button (Half Duplex Listen) and the user who is talking has a LISTEN button (Talking Half Duplex). When the LISTEN button is clicked, the user who is talking allows the user who is listening to talk.

The talk tool that enables the audio transfer (talk) functionality may be any type of client controller (e.g., software, application, program) loaded on to a client device. The talk tool supports use by different OSP and IM clients. The talk tool is responsible for responding to user interfaces and translating user commands into the appropriate actions with the client device. For example, the talk tool opens, reads, writes, and closes the physical components on the client devices needed for audio. The talk tool also controls audio and control channels with callbacks being executed to indicate status change. When the talk tool is loaded, the talk tool determines if the client device is capable of handling full duplex.

The talk tool also may allow the user to control the volume for the speaker and microphone. In one implementation, the user speaks into a microphone and the audio data are recorded into memory. While in the record mode, the average level of the speaker's voice is indicated on a level meter displayed on a user interface of the talk tool. A slider control is used to adjust the input level to an optimal value. After the speaker stops speaking, the speaker's stored speech is played back through the computer's audio output device. The speaker level slider control may be used to adjust the output level to an acceptable volume. If the user starts to speak again, the talk tool reverts to the record mode and the cycle repeats. Once the user is satisfied with the settings, the user can save the settings for use in subsequent talk sessions.

The talk tool may support additional functionality including, but not limited to, multi-conferencing, hold, and muting. Multi-conferencing allows more than two users to engage in a talk session. Hold allows the suspension of an active talk session in order to connect to another talk session. Muting turns off the microphone to prevent user feedback/echo during full duplex mode.

The talk tool also may include security features to protect the integrity of transferred data. For example, the talk tool may compress data using a proprietary algorithm or may send the data in a proprietary protocol. To further improve security, the talk tool may select the port numbers at random from a large range.

In general, an instant messaging talk session is similar to a telephonic session in that it has the same three states: not connected (hung up), connecting (ringing), and connected (talking). As described above, these states and the ability to switch among them are supported by corresponding UIs, namely a START TALK UI (not connected), a CONNECT UI (ringing), and an END TALK UI (connected).

Figure 7:
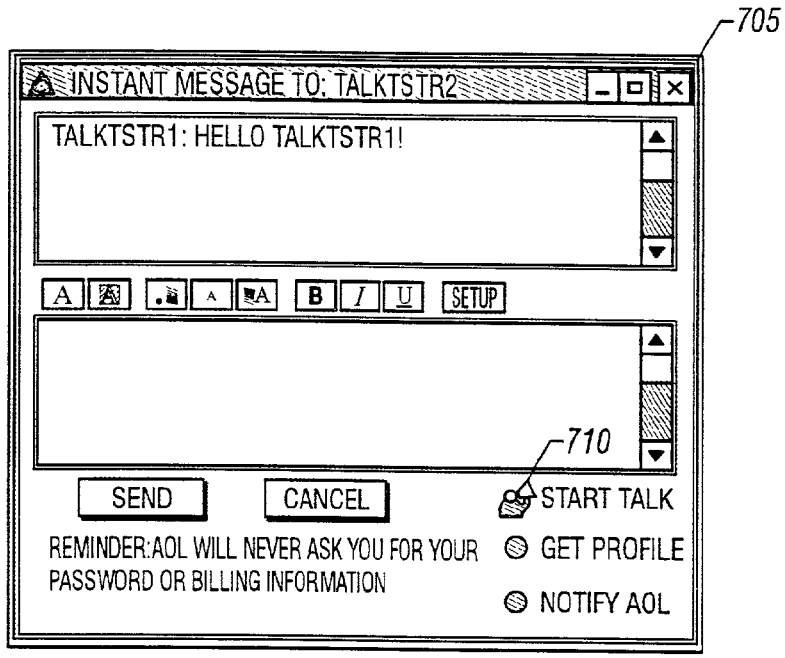
FIGS. 7-10 are illustrations of different graphical user interfaces that may be provided by the systems of FIGS. 1-5.

FIG. 7 illustrates one example of a START TALK UI. As shown in FIG. 7, a START UI 700 includes an instant message box 705 having a START TALK button 710 for requesting a talk session.

Figure 8:
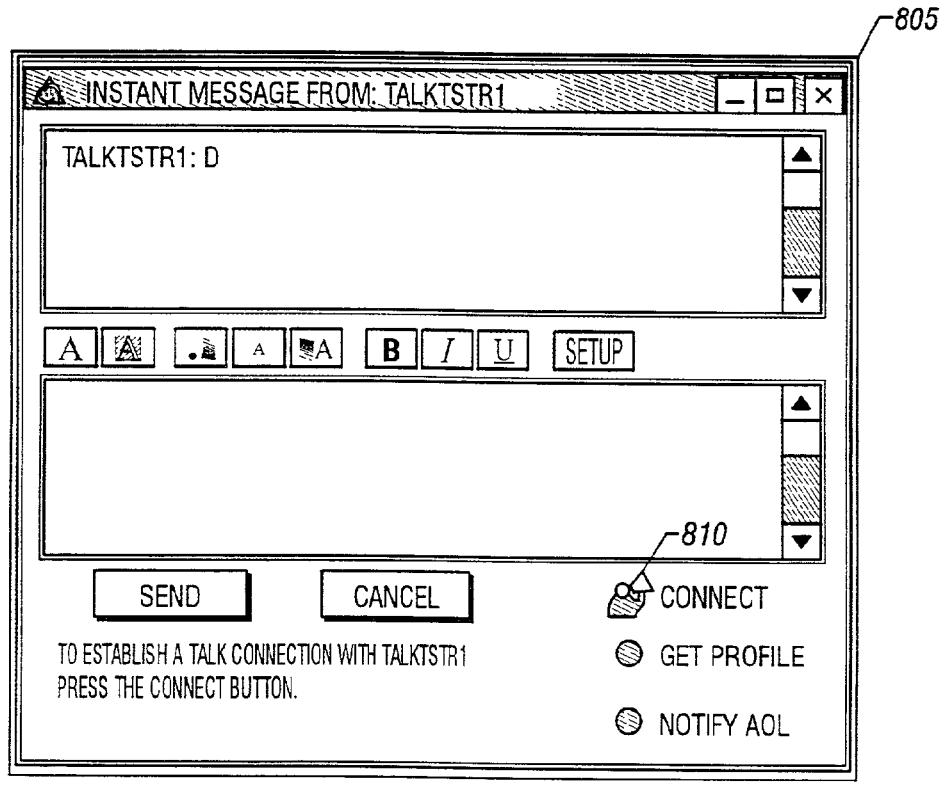

FIG. 8 illustrates one example of a CONNECT UI. As shown in FIG. 8, a UI 800 includes an instant message box 805 having a CONNECT button 810 for accepting a request to initiate a talk session.

Figure 9:
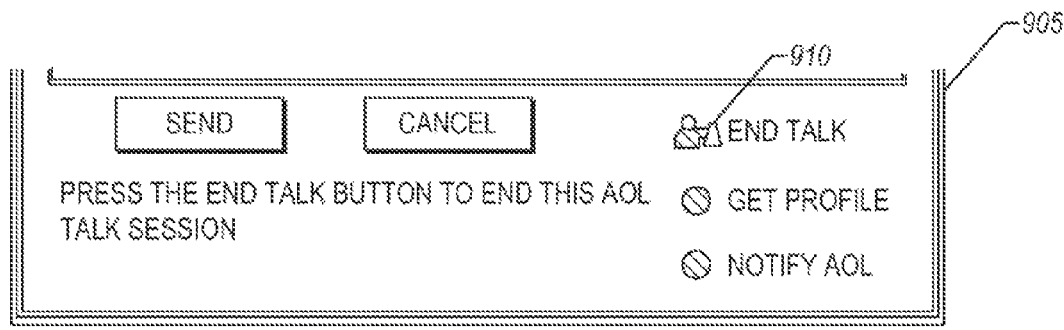

FIG. 9 illustrates one example of an END TALK UI. As shown in FIG. 9, a UI 900 includes an instant message box 905 having an END TALK button 910 for terminating a talk session.

Figure 10:
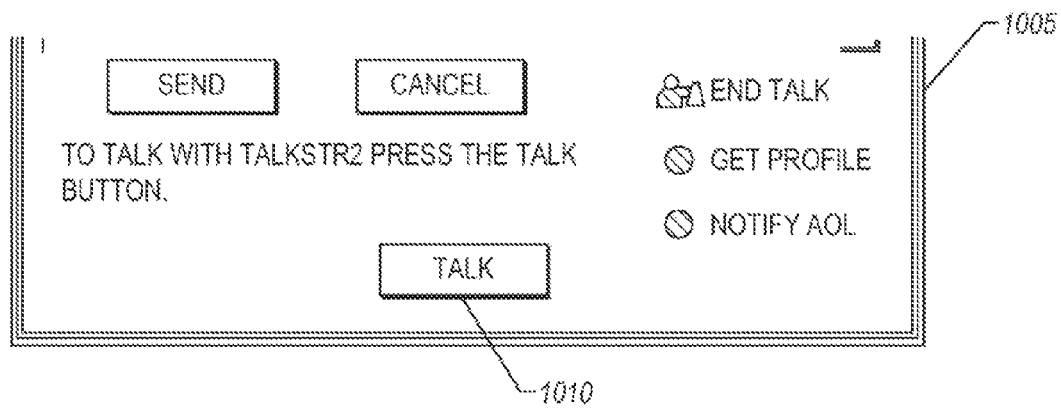

FIG. 10 illustrate one example of a half duplex user interface. As shown in FIG. 10, a UI 1000 includes an instant message box 1005 having a TALK button 1010. The bottom 1010 is greyed out or otherwise disabled when the other party is talking.

Other embodiments are within the scope of the following claims.

What is claimed is:

1. A method comprising:
    enabling presentation of a first communication graphical user interface to a sender, the first communication graphical user interface comprising one or more communication options including a voice communication option;
    enabling presentation of a second communication graphical user interface to a recipient;
    determining voice communication capabilities of the recipient;
    receiving, at a server, an indication that the sender has selected the voice communication option; and
    establishing, based on the determined voice communication capabilities of the recipient and based on the indication that the sender has selected the voice communication option, a voice communication between the sender and the recipient using more than one channel including at least a generic signaling interface channel.

2. The method of claim 1, further comprising providing a list of users associated with the sender, wherein the list comprises indications of the voice communication capabilities of the users associated with the sender.

3. The method of claim 1, wherein determining voice communication capabilities of the recipient comprises determining whether the recipient has enabled a hardware device for voice communication.

4. The method of claim 1, wherein determining voice communication capabilities of the recipient comprises determining whether the recipient has enabled software for voice communication.

5. The method of claim 1, further comprising enabling voice communication between the sender, the recipient, and a third identity.

6. The method of claim 1, further comprising reporting the voice communication capabilities of the recipient to the sender.

7. The method of claim 1, wherein the communication graphical user interface comprises a display of a second voice communication option.

8. The method of claim 7, wherein the second voice communication option indicates that the sender has voice communication capabilities.

9. The method of claim 1, wherein the more than one channel further comprises a different communications channel than a control channel associated with instant message communications between the sender and the recipient.

10. A computer-based system comprising:
    at least one processor; and
    a storage device storing a plurality of instructions, the plurality of instructions being executable by the at least one processor for:
    enabling presentation of a first communication graphical user interface to a sender, the first communication graphical user interface comprising one or more communication options including a voice communication;
    enabling presentation of a second communication graphical user interface to a recipient;
    determining voice communication capabilities of the recipient;
    receiving an indication that the sender has selected the voice communication option; and
    establishing, based on the determined voice communication capabilities of the recipient and based on the indication that the sender has selected the voice communication option, a voice communication between the sender and the recipient using more than one channel including at least a generic signaling interface channel.

11. The system of claim 10, wherein the storage device further comprises instructions executable by the at least one processor for providing a list of users associated with the sender, wherein the list comprises indications of the voice communication capabilities of the users associated with the sender.

12. The system of claim 10, wherein determining voice communication capabilities of the recipient comprises determining whether the recipient has enabled a hardware device for voice communication.

13. The system of claim 10, wherein determining voice communication capabilities of the recipient comprises determining whether the recipient has enabled software for voice communication.

14. The system of claim 10, wherein the storage device further comprises instructions executable by the at least one processor for enabling voice communication between the sender, the recipient, and a third identity.

15. The system of claim 10, wherein the storage device further comprises instructions executable by the at least one processor for reporting the voice communication capabilities of the recipient to the sender.

16. The system of claim 10, wherein the second communication graphical user interface comprises a display of a second voice communication icon.

17. The system of claim 16, wherein the second voice communication icon indicates that the sender has voice communication capabilities.

18. The system of claim 10, wherein the more than one channel further comprises a different communications channel than a control channel associated with an instant message communications between the sender and the recipient.

* * * * *